(12) United States Patent
Ito et al.

(10) Patent No.: US 6,630,010 B2
(45) Date of Patent: Oct. 7, 2003

(54) METHOD OF PRODUCING METALLIC IRON

(75) Inventors: Shuzo Ito, Osaka (JP); Yasuhiro Tanigaki, Osaka (JP); Shoichi Kikuchi, Osaka (JP); Osamu Tsuge, Osaka (JP); Isao Kobayashi, Osaka (JP); Keisuke Honda, Osaka (JP); Koji Tokuda, Osaka (JP); Hidekazu Okamoto, Osaka (JP)

(73) Assignee: Midrex International B.V. Zurich Branch, Zurich (SE)

( * ) Notice: Subject to any disclaimer, the term of this patent is extended or adjusted under 35 U.S.C. 154(b) by 0 days.

(21) Appl. No.: 09/818,591

(22) Filed: Mar. 28, 2001

(65) Prior Publication Data

US 2001/0027701 A1 Oct. 11, 2001

(30) Foreign Application Priority Data

| Mar. 30, 2000 | (JP) | 2000-094764 |
| Mar. 31, 2000 | (JP) | 2000-098825 |
| Apr. 18, 2000 | (JP) | 2000-116383 |

(51) Int. Cl.$^7$ .............................................. C21B 11/00
(52) U.S. Cl. ............................. 75/484; 75/500; 75/503; 75/504
(58) Field of Search ................. 75/484, 500, 503, 75/504

(56) References Cited

U.S. PATENT DOCUMENTS

| 1,885,381 A | 11/1932 | Simpson |
| 3,197,303 A | 7/1965 | Collin |
| 3,443,931 A | 5/1969 | Beggs et al. |
| 3,452,972 A | 7/1969 | Beggs |
| 3,947,621 A | 3/1976 | Collin et al. |
| 5,637,133 A | 6/1997 | Munnix et al. |
| 5,885,521 A | 3/1999 | Meissner et al. |

(List continued on next page.)

FOREIGN PATENT DOCUMENTS

| DE | 195 43 074 | 5/1997 |
| EP | 0 947 586 | 10/1999 |
| EP | 0 969 105 | 1/2000 |
| EP | 1 026 265 | 8/2000 |
| JP | 11-106812 | 4/1999 |
| JP | 11-335712 | 12/1999 |
| JP | 2000-45008 | 2/2000 |
| WO | WO 98/46953 | 10/1998 |
| WO | WO 98/59079 | * 12/1998 |
| WO | WO 99/16913 | 4/1999 |
| WO | WO 00/29628 | 5/2000 |

*Primary Examiner*—Melvyn Andrews
(74) *Attorney, Agent, or Firm*—Oblon, Spivak, McClelland, Maier & Neustadt, P.C.

(57) ABSTRACT

The present invention is directed to a method of producing granular metallic iron, including: heating a formed raw material comprising a carbonaceous reductant and a substance containing iron oxide in a reduction melting furnace to subject the iron oxide contained in the formed raw material to solid-state reduction; and carburizing reduced iron resulting from the solid-state reduction with carbon contained in the carbonaceous in the formed raw material and causing resulting molten metallic iron to coalesce into the granular metallic iron, wherein an atmospheric gas present in proximity to the formed raw material in the carburizing and melting step has a reduction degree of not less than 0.5. The present invention is also directed to a method of producing metallic iron, including forming a deposit layer containing slag produced in the reduction melting process on hearth refractories, thereby protecting the hearth refractories while producing the metallic iron. The present invention is further directed to a device for supplying an auxiliary raw material to a hearth of a moving hearth type reduction melting furnace adapted to produce metallic iron, the device including a supply duct vertically connecting with a ceiling portion of the furnace.

10 Claims, 24 Drawing Sheets

U.S. PATENT DOCUMENTS

| | | |
|---|---|---|
| 5,972,066 A | 10/1999 | Lehtinen |
| 5,989,019 A | 11/1999 | Nishimura et al. |
| 6,036,744 A | 3/2000 | Negami et al. |
| 6,063,156 A | 5/2000 | Negami et al. |
| 6,126,718 A | 10/2000 | Sawa et al. |
| 6,129,777 A | 10/2000 | Fuji et al. |
| 6,135,766 A | 10/2000 | Takeda et al. |
| 6,149,709 A | 11/2000 | Uragami et al. |
| 6,152,983 A | 11/2000 | Kamijo et al. |
| 6,210,462 B1 | 4/2001 | Kikuchi et al. |
| 6,241,803 B1 | 6/2001 | Fuji |
| 6,251,156 B1 * | 6/2001 | Hoffman et al. ............... 75/484 |
| 6,251,161 B1 | 6/2001 | Tateishi et al. |
| 6,258,149 B1 * | 7/2001 | Sugiyama et al. ............ 75/484 |

* cited by examiner

MOVING DIRECTION OF HEARTH

STATE OF GRANULAR IRON AND SLAG IMMEDIATELY
AFTER REDUCTION MELTING

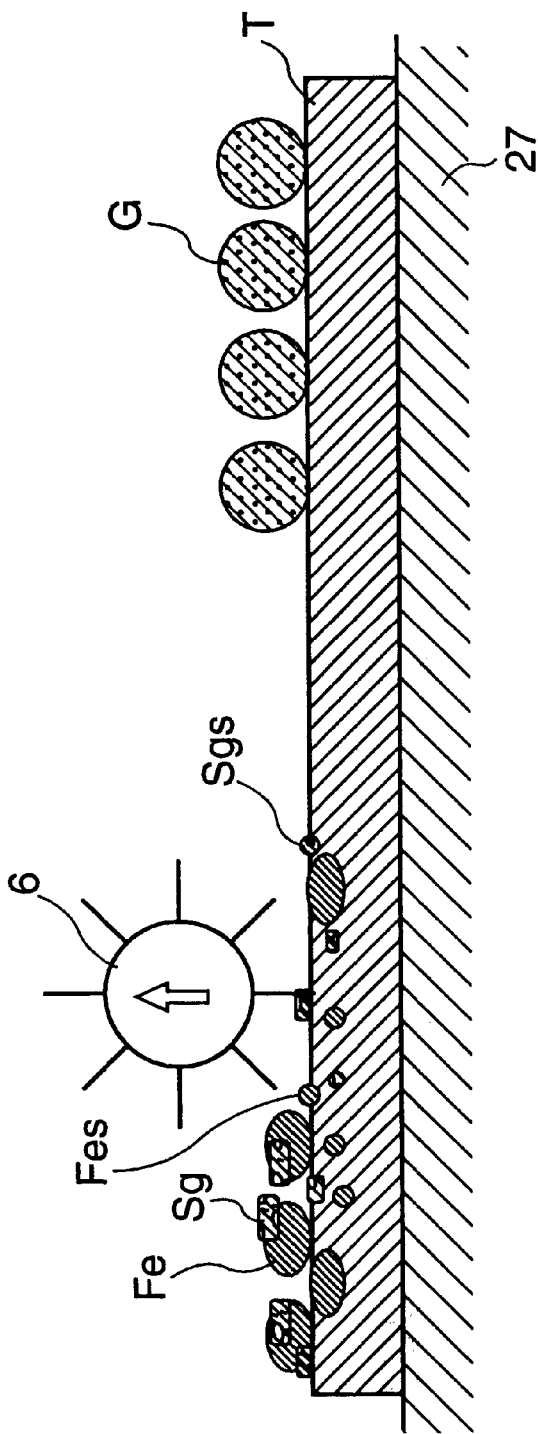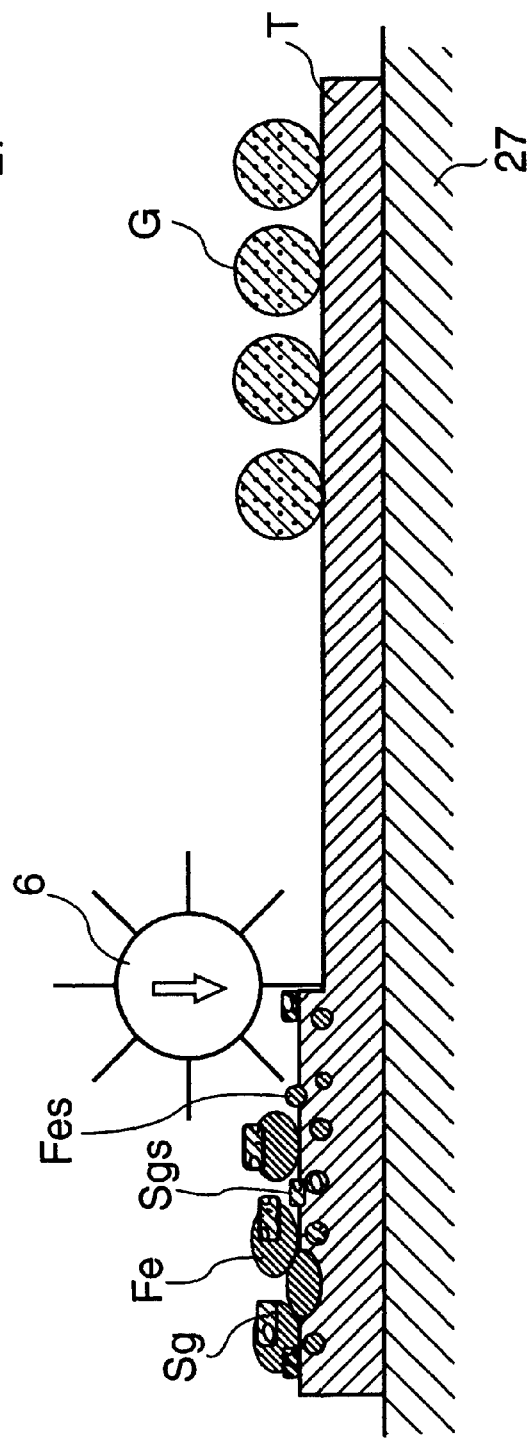

EXAMPLE OF GRANULAR IRON
AS PRODUCT

METHOD OF PRODUCING METALLIC IRON

BACKGROUND OF THE INVENTION

1. Field of the Invention

The present invention relates to improvements in the art of reducing iron oxide such as iron ore by heating with use of a carbonaceous reductant such as coke to produce metallic iron. More specifically, the present invention relates to an improved method which is capable of efficiently reducing iron oxide into metallic iron by a simplified treatment while efficiently separating slag forming components included as gangue in iron ore and the like from metallic iron in the form of slag, thereby obtaining high-purity granular metallic iron in a high yield.

The present invention also relates to a method of producing metallic iron, which is improved to ensure a stabilized continuous production by lessening damage to hearth refractories that is a problem in producing metallic iron from a formed raw material comprising a carbonaceous reductant and a substance containing iron oxide with use of a moving hearth type reduction melting furnace.

The present invention further relates to an improved feed device for efficiently supplying auxiliary raw materials such as an atmosphere adjusting agent onto the hearth of a moving hearth type reduction melting furnace.

2. Description of the Related Art

The shaft kiln process, a representative of which is the Midrex process, is conventionally known as a direct ironmaking method for obtaining reduced iron by directly reducing an iron oxide source such as iron ore or iron oxide with use of a carbon material or a reducing gas. According to the direct ironmaking method of this type, a reducing gas prepared from natural gas is blown into the furnace through a tuyere opening defined in a lower portion of the shaft kiln, and iron oxide is reduced into metallic iron by the reducing power of the reducing gas. Attention has recently been directed to another reduced iron producing process which uses a carbon material such as coal instead of natural gas as a reducing agent, and one such process, what is called "SL/RN" process, has already been put to practice.

U.S. Pat. No. 3,443,931 discloses another process wherein a carbon material and powdery iron oxide are mixed together and formed into a mass or a pellet, which in turn is subjected to reduction by heating on a rotary hearth to produce reduced iron.

U.S. Pat. No. 5,885,521 discloses a technique wherein a granular raw material of reduced iron dried in a drying furnace is supplied to the hearth through a supply pipe extending through a ceiling portion of a moving hearth type furnace down to a location adjacent the hearth, and the layer thickness of the granular raw material of reduced iron is primarily adjusted with a pellet leveler provided on a side face of the leading end of the supply pipe and then further adjusted with a smoother provided downstream of the pellet leveler in the moving direction of the hearth.

Also, a melting reduction process such as the DIOS process is known as a process for directly reducing iron oxide into reduced iron. According to this process, iron oxide is previously reduced to a reduction rate of about 30%, and thereafter such iron oxide is directly subjected to a reduction reaction with carbon in an iron bath until iron oxide is turned into metallic iron.

Japanese Patent Laid-Open Gazette No. HEI 8-27507 discloses another direct reduction ironmaking process wherein a layer of a carbonaceous reductant powder containing a desulfurizing agent and a layer of iron oxide powder are stacked on each other on a moving hearth and the stack thus formed is heated to obtain sponge iron.

Japanese Patent Laid-Open Gazette No. HEI 11-106812 discloses a technique wherein a raw material comprising iron ore and a solid reducing agent supplied into a rotary hearth type furnace (reducing furnace) through a pipe-shaped charging bore extending through a ceiling portion of the furnace is passed on a partition wall to the hearth, and the hearth bearing the raw material is moved to allow the raw material to be reduced during one round within the furnace and then ejected. This technique is particularly characterized that high-temperature ore having been reduced is laid under the partition wall to preheat the raw material on the partition wall by utilizing radiant heat from the reduced ore, while the reduced ore of which the temperature is lowered is ejected through an ejection port.

The inventors of the present invention have been making a study for a long time to develop a technique which is capable of efficiently obtaining metallic iron having a high iron purity from iron ore having a relatively low content of iron as well as from iron oxide having a higher content of iron by a simplified treatment. The following method, developed as a result of the study, was formerly proposed in Japanese Patent Laid-Open Gazette No. HEI 9-256017.

This method is characterized that in the production of metallic iron by reducing a formed body comprising a carbonaceous reductant and iron oxide by heating, the iron oxide is reduced in a solid state by heating to form and grow a metallic iron skin, the reduction by heat is continued until iron oxide is no longer present inside, and heating is further continued to cause slag produced inside to flow out of the metallic iron skin thereby separating metallic iron and slag from each other.

SUMMARY OF THE INVENTION

According to one aspect of the present invention, there is provided a method of producing granular metallic iron, comprising: heating a formed raw material comprising a carbonaceous reductant and a substance containing iron oxide in a reduction melting furnace to subject the iron oxide contained in the formed raw material to solid-state reduction; and carburizing reduced iron resulting from the solid-state reduction with carbon contained in the carbonaceous reductant to cause the reduced iron to melt, while separating off gangue components contained in the formed raw material and causing resulting molten metallic iron to coalesce into the granular metallic iron, wherein an atmospheric gas present in proximity to the formed raw material in the caburizing and melting step has a reduction degree of not less than 0.5.

According to another aspect of the present invention, there is provided a method of producing metallic iron, comprising forming a deposit layer containing slag produced in a reduction melting process on hearth refractories, thereby protecting the hearth refractories while producing the metallic iron.

According to yet another aspect of the present invention, there is provided a device for supplying a raw material or an auxiliary raw material to a hearth of a moving hearth type reduction melting furnace adapted to produce metallic iron, the device comprising a supplying duct vertically connecting with a ceiling portion of the furnace.

These and other features and attendant advantages of the present invention will become apparent from the reading of the following detailed description with reference to the attached drawings.

BRIEF DESCRIPTION OF THE DRAWINGS

FIG. 19 is a conceptual view illustrating how the hearth is mended according to another example of the invention;

DETAILED DESCRIPTION OF THE PREFERRED EMBODIMENTS OF THE INVENTION

Figure 1:
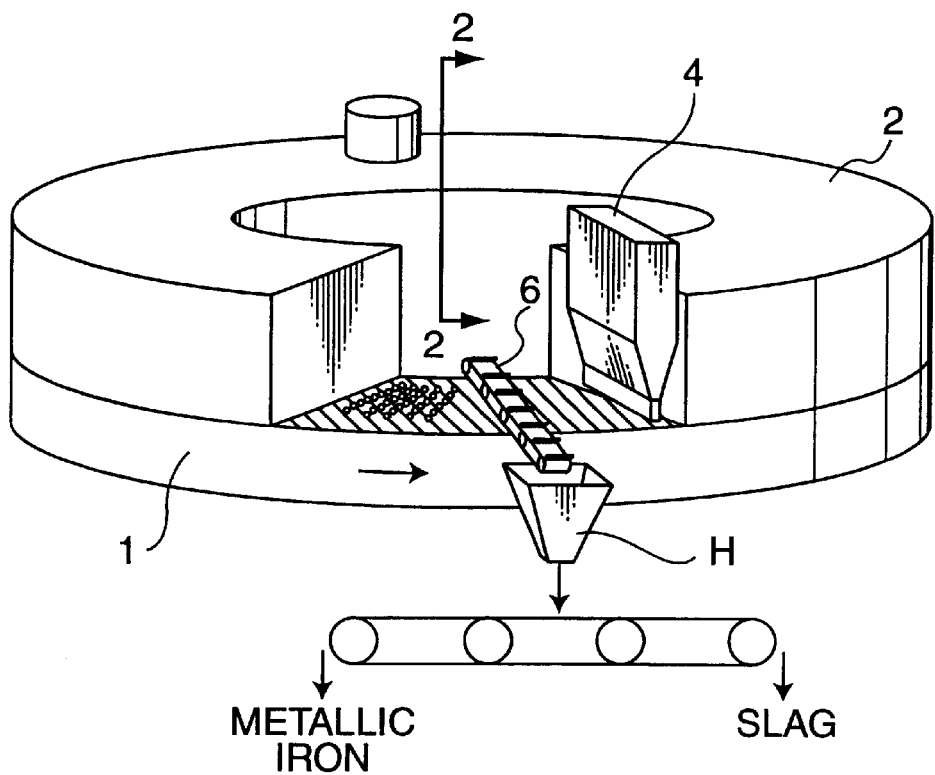
FIG. 1 is a schematic view illustrating reduction melting equipment used in the present invention.

The inventors of the present invention have been continuously making study to further improve their laid-open invention mentioned above. Study directed to one such improvement has been made mainly of condition control in the carburizing-melting stage in attempt to raise the purity and the yield of metallic iron by depressing re-oxidation of metallic iron due to an oxidizing gas such as $CO_2$ or $H_2O$ particularly in the carburizing-melting stage following the solid-state reduction stage.

As a result, it has been discovered that though the reducing power of the atmospheric gas present in proximity to the formed raw material is kept high by a reducing gas (chiefly carbon monoxide) resulting from the reaction between a large amount of the carbonaceous reductant and iron oxide contained in the formed raw material when the solid-state reduction proceeds, the reduced iron thus produced is likely to be re-oxidized in the last stage of the solid-state reduction and the subsequent carburizing-melting stage because the amount of carbon monoxide produced in these stages is reduced while the concentration of oxidizing gas such as carbon dioxide gas or water content produced as exhaust gas resulting from burner combustion for heating becomes relatively high in those stages.

Accordingly, it is an object of the present invention to establish a technique which is capable of minimizing re-oxidation of metallic iron in the last stage of the solid-state reduction and thereafter, particularly in the carburizing-melting stage of the production of metallic iron, thereby efficiently producing granular metallic iron having a high metallization rate and a high purity of iron in a high yield.

Another object of the present invention is to establish a technique which is capable of reducing erosion or wear of hearth refractories due to molten FeO produced in a metallic iron producing process to ensure prolonged life of the hearth refractories, thereby enhancing the maintainability of the equipment and ensuring a long-term continuous production.

Yet another object of the present invention is to establish a technique which is capable of charging an auxiliary raw material onto a hearth in such a manner as to form a thin layer of the auxiliary raw material which is uniform in the widthwise direction of the hearth.

In one aspect, the method of the present invention is characterized that in reduction melting a formed raw material comprising an iron oxide source such as iron ore, iron oxide, or a partially reduced product thereof (hereinafter referred to as "iron ore or the like" as the case may be) and a carbonaceous reductant such as coal (hereinafter referred to as "carbon material" as the case may be) to produce granular metallic iron, the conditions of the atmosphere in the last stage of the production, particularly in the carburizing-melting stage are controlled properly to prevent reduced iron from re-oxidizing, thereby making it possible to produce granular metallic iron having a high purity of Fe while depressing the production of FeO due to re-oxidation of metallic iron to minimize erosion or wear of hearth refractories. Hereinafter, specific features of the present invention will be described in detail with reference to the drawings illustrating examples of the invention.

Figure 2:
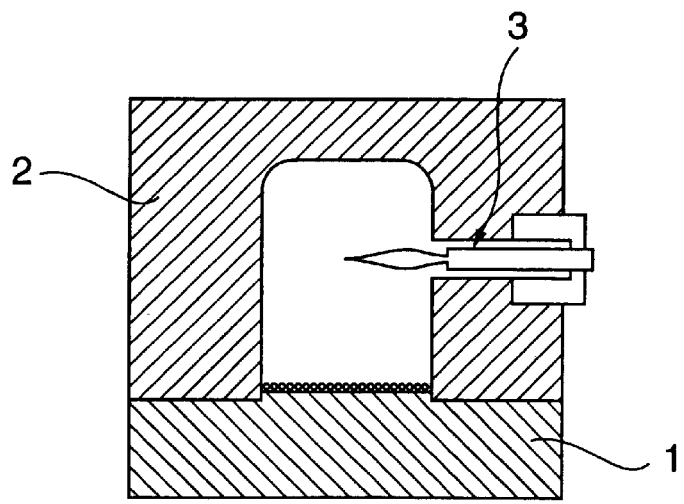
FIG. 2 is a view equivalent to a sectional view taken on line A—A in FIG. 1.
Figure 3:
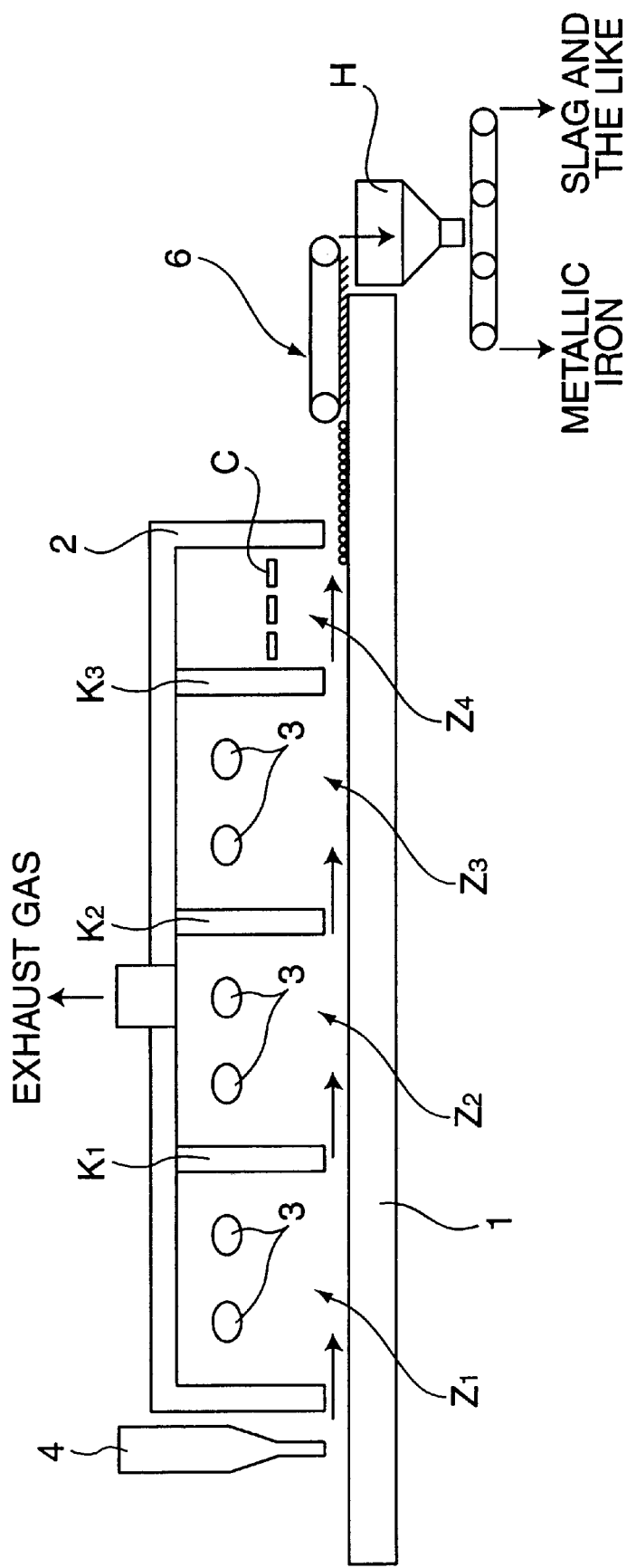
FIG. 3 is an explanatory sectional view of the equipment in FIG. 1 as developed in the longitudinal direction.

FIGS. 1 to 3 are schematic views illustrating an example of a moving hearth type reduction melting furnace developed by the inventors of the present invention, to which the present invention is applied. The furnace shown is of a dome structure having a rotary hearth. FIG. 1 is a schematic view showing the construction of the furnace; FIG. 2 is a view equivalent to a sectional view taken on line A—A in FIG. 1; and FIG. 3 is a schematic explanatory view showing the furnace in FIG. 3 as developed in the direction of rotation of the rotary hearth for easy understanding. In these drawings, reference character 1 designates the rotary hearth, which is configured to be driven for rotation at an appropriate speed by a driving device not shown, and reference character 2 designates a furnace body covering the rotary hearth 1.

The moving hearth type reduction melting furnace to which the present invention is applicable is not limited to the shape and structure shown in FIGS. 1 to 3. The present invention can be effectively applied to a moving hearth type reduction melting furnace of any other structure such as a straight grate type structure so long as the furnace has a moving hearth as an essential component.

The furnace body 2 is provided with a plurality of burners 3 on appropriate wall surfaces thereof and heat of combustion caused by these burners 3 and radiant heat thereof are transferred to a formed raw material on the rotary hearth 1 to cause reduction of the formed raw material under heating. The furnace body 2 shown, which is a preferred example, has an inner space partitioned into a first zone $Z_1$, a second zone $Z_2$, a third zone Z, and a fourth zone $Z_4$ with three partition walls $K_1$, $K_2$ and $K_3$. On the most upstream side of the furnace body 2 in the direction of rotation of the rotary hearth 1 are placed the raw material and auxiliary raw material feed means 4 facing the rotary hearth 1, while discharger 6 is provided on the most downstream side in the rotating direction. It should be noted that since the hearth 1 is of the rotary type, it can be said that the discharger 6 is provided on the side immediately upstream of the feed means 4.

In the operation of the reduction melting furnace, pieces of the formed raw material comprising iron ore or the like and carbon material are supplied from the feed means 4 onto the rotary hearth 1 rotating at a predetermined speed in such a manner as to form a layer having an appropriate thickness. The formed raw material charged on the hearth 1 is subjected to heat of combustion caused by the burners 3 and radiant heat thereof during passage through the zone $Z_1$, with the result that iron oxide in the formed raw material is reduced under heating while keeping its solid state by the carbon material contained in the formed raw material and carbon monoxide produced by combustion of the carbon material. Subsequently, the formed raw material is further reduced under heating in the second zone $Z_2$ to produce reduced iron that has been substantially completely reduced. The resulting reduced iron is then carburized and melted by further heating in a reducing atmosphere in the third zone $Z_3$, with the result that the reduced iron coalesces into granular metallic iron while separating from slag produced as a byproduct. The granular metallic iron thus produced is cooled and solidified by any cooling means C in the fourth zone $Z_4$, and then sequentially raked out by the discharger 6 located downstream thereof. At this time, the slag produced as a byproduct is also ejected together with the metallic iron. These metallic iron and slag are fed to desired separating means (a sieve or a magnetic selector) by a hopper H so as to be separated from each other. Finally, there can be obtained metallic iron having an iron purity of about 95% or more, preferably about 98% or more, with an extremely low slag content.

Although the fourth zone $Z_4$ in the drawing is open to the outside atmosphere, it is practically desirable that the furnace be substantially closed with a cover to minimize heat dissipation and allow the inside atmosphere to be adjusted properly. Though the inner space of the furnace shown is partitioned into the first zone $Z_1$, second zone $Z_2$, third zone $Z_3$ and fourth zone $Z_4$ with three partition walls $K_1$, $K_2$ and $K_3$, the present invention is not limited to such a partitioned structure, appropriate modifications can of course be made to accommodate the size of the furnace, target production capacity, system of operation, or the like. It is, however, desirable in the present invention that a partition wall be provided at least between a solid-state reduction region corresponding to the first half stage of the reduction-by-heating process and a carburizing-melting-coalescence region corresponding to the second half stage to allow the temperature and the atmospheric gas in the furnace to be controlled on a region basis.

Furthermore, desirable in the present invention that a solid reduction maturity region be provided at least between the solid-state reduction region corresponding to the first half of heating reduction and a carburizing-melting-coalescence region corresponding to the second half, and the temperature and atmospheric gas in the furnace to be controlled a region basis.

As apparent from FIG. 3, the 1st zone Z1 is a solid reduction region and the 2nd zone Z2 is a solid reduction maturity region, and the 3rd zone Z3 is a carburizing-melting-coalescence region. In this solid reduction maturity region, the reduction degree of atmospheric gas in a furnace is raised with means, such as addition of a natural gas, COG gas, methane gas, etc., maintaining the inside of a furnace to the temperature at which a formed raw material maintains a solid state. As a result, The dispersion in the reduction rate of the formed raw materials resulting from a granularity size distribution of the formed raw materials, the heterogeneity of the state in a furnace, etc. decreases, and the reduction rate of the whole formed raw materials is raised. And the carburizing and the melting of the formed raw materials in carburizing-melting-coalescence region which continues behind are stable.

When the temperature of the atmosphere in the reduction (solid-state reduction) stage of the reduction melting process is too high, more specifically, when the temperature of the atmosphere becomes higher than the melting point of a slag component including gangue components contained in the raw material, unreduced iron oxide and the like in a certain period of the reduction process, such a slag component having a lower melting point melts and reacts with refractories forming the moving hearth to cause erosion or wear of the refractories. Consequently, the smoothness of the hearth cannot be maintained. Further, when iron oxide is heated too much than necessary for reduction in the solid-state reduction stage, FeO as an iron oxide contained in the raw material melts before being reduced and, hence, what is called "smelting reduction" (a phenomenon that iron oxide is reduced in a smelting, which is different from the solid-state reduction) in which molten FeG reacts with carbon (C) contained in the carbon material, proceeds rapidly. Though the smelting reduction also gives metallic iron, the smelting reduction produces FeO-containing slag having a higher fluidity, which in turn causes heavy erosion or wear of the hearth refractories. Consequently, it is difficult to ensure a continuous production which is required of a furnace for practical use.

Although such a phenomenon is influenced by the kinds of iron ore and carbon material forming the formed raw material or the composition of the slag forming component contained in a binder or the like, it has been discovered that when the temperature of the atmosphere in the solid-state reduction is higher than about 1400° C., low-melting-point slag as described above seeps to cause erosion or wear of the hearth refractories, and that when the temperature of the atmosphere is higher than 1500° C., the undesired smelting reduction proceeds irrespective of the kind or brand of iron ore or a like raw material, with the result that the hearth refractories suffer heavy erosion or wear.

Figure 4:
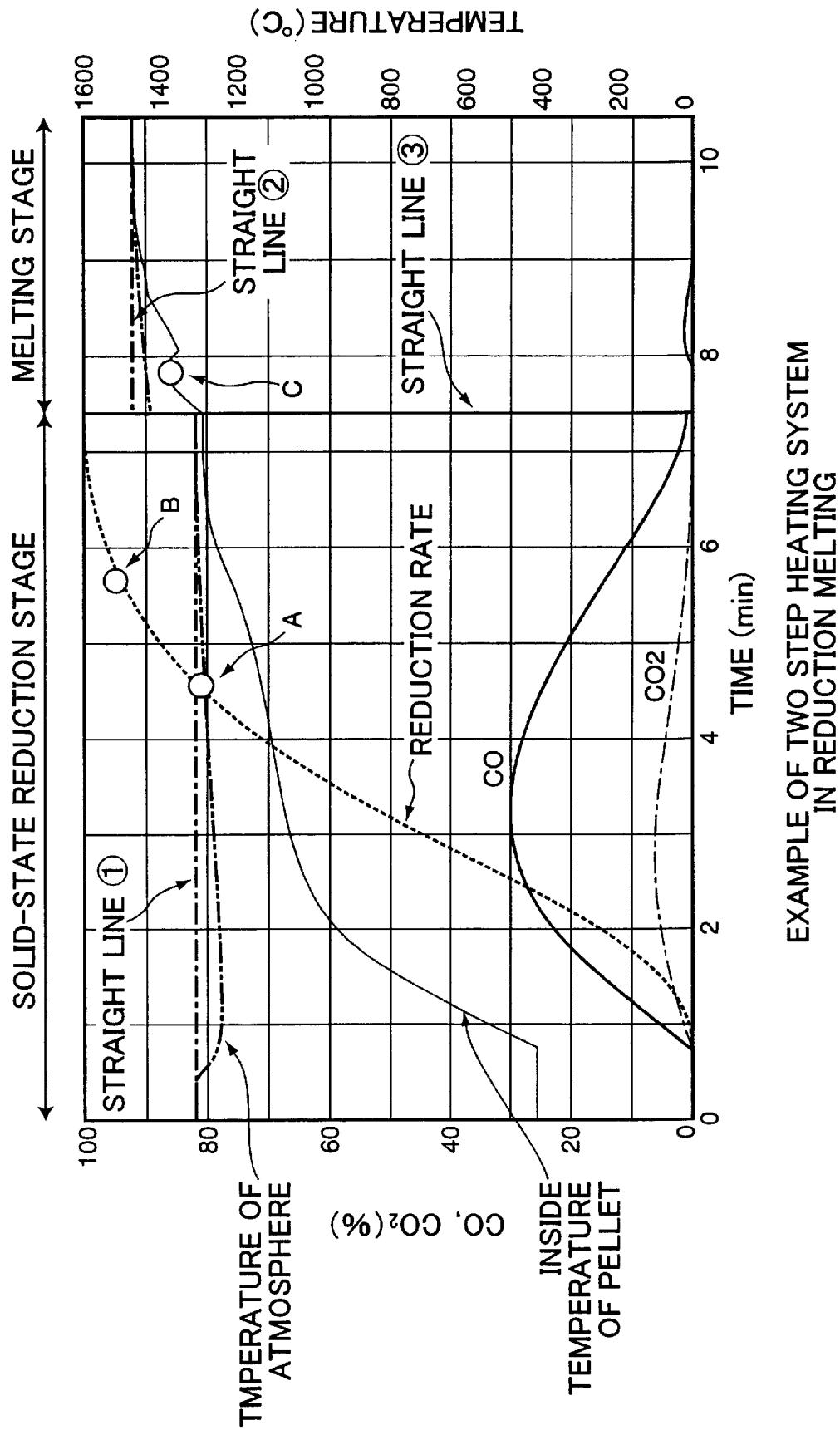
FIG. 4 is a graph showing respective changes in the temperature of the atmosphere, temperature of a formed raw material, reduction rate, and amounts of CO exhaust gas and $CO_2$ exhaust gas throughout a solid-state reduction stage and a melting stage in a two-step heating system employed in the invention.

FIG. 4 graphically shows reaction situations in the case where a formed raw material (in the form of pellet having a diameter of 16 to 19 mm) comprising iron ore as an iron oxide source and coal as a carbonaceous reductant was charged into a furnace controlled to maintain the atmospheric temperature at about 1300° C. (represented by a straight line ① in the graph), subjected to solid-state reduction until the reduction rate (the rate of oxygen removed from iron oxide contained in the formed raw material) reached about 100%, and resulting reduced iron was charged into a melting zone controlled to maintain the atmospheric temperature at about 1425° C. (represented by a straight line ②) at a point of time represented by a straight line ③). FIG. 4 also shows the inside temperature of the formed raw material continuously measured by a thermocouple previously inserted into the formed raw material, the atmospheric temperature in the furnace, and respective changes with time in the concentrations of carbon dioxide and carbon monoixide produced in the reduction process.

As apparent from FIG. 4, granular metallic iron can be efficiently and stably produced if a two-step heating system is adopted so as to cause reduction to proceed until the reduction rate (oxygen removal rate) reaches 80% (indicated by point A in FIG. 4) or more, preferably 95% (indicated by point B in FIG. 4) or more, with the formed raw material in the furnace being kept in a solid state without occurrence of partial melting of the slag component contained in the formed raw material. Specifically, the two-step heating system is such that the solid-state reduction is allowed to proceed with the inside temperature of the furnace held within a range of 1200 to 1500° C., more preferably 1200 to 1400° C., and subsequently the inside temperature of the furnace is raised to 1350 to 1500° C. to reduce an iron oxide portion left unreduced and to cause carburizing-melting-coalescence of resulting metallic iron.

As to the change with time in the atmospheric temperature continuously measured in FIG. 4, a temperature drop of about 80 to 100° C. from the established inside temperature which had been set to 1300° C. before the starting of the experiment was observed when the formed raw material was charged into the furnace, and thereafter the inside temperature gradually rose, and in the last stage of the solid-state reduction, it resumed the initially set temperature. Since the temperature drop in the beginning of the experiment was caused due to the characteristics of the furnace, such a temperature drop in the initial stage can be minimized if the heating means of the furnace is modified.

As to time represented by the abscissa in FIG. 4, the solid-state reduction, melting and coalescence of iron oxide can usually be completed in about 10 to 13 min, though such a time period slightly varies depending upon the compositions of iron ore and carbon material forming the formed raw material and like factors.

If the solid-state reduction of the formed raw material proceeds with the reduction rate kept below 80%, followed by melting by heating, seeping of low-melting-point slag from the formed raw material occurs to cause erosion or wear of the hearth refractories, as described above. In contrast, if the reduction rate is kept 80% or more, preferably 95% or more in the last stage of the solid-state reduction and the subsequent process, namely carburizing-melting-coalescence, was performed, reduction of a FeO portion left unreduced in the formed raw material proceeds inside the formed raw material and, hence, seeping of slag can be minimized thereby ensuring a stabilized continuous production without heavy erosion or wear of the hearth refractories.

A proper inside temperature of the furnace at which a higher reduction rate can be ensured without seeping of the low-melting-point slag in the first stage, namely the solid-state reduction stage in FIG. 4 is within the range of 1200 to 1500° C., preferably 1200 to 1400° C. If the inside temperature of the furnace is lower than 1200° C., the solid-state reduction proceeds slowly and, hence, the formed raw material is required to reside in the furnace for a longer time, thus resulting in lower productivity. On the other hand, if the inside temperature is 1400° C. or higher, particularly higher than 1500° C., seeping of the low-melting-point slag occurs in the reduction process irrespective of the kind or brand of iron ore or the like in the raw material as described above, to cause heavy erosion or wear of the hearth refractories thereby making the continuous production difficult. Though there may be a case where some composition or proportion of iron ore used as a raw material does not allow the seeping phenomenon to occur in the temperature range of 1400 to 1500° C., the frequency and the likelihood of such a case are relatively low. Accordingly, a suitable temperature in the solid-state reduction stage is in the range of 1200 to 1500° C., preferably 1200 to 1400°0 C. In a practical operation, it is, of course, possible that the inside temperature of the furnace is set at 1200° C. or lower in the beginning of the solid-state reduction stage and then raised to a value within the range between 1200° C. and 1500° C. in the latter half of the solid-state reduction stage to cause solid-state reduction to proceed.

The formed raw material having finished with desired solid-state reduction in the solid-state reduction region is transferred to the melting region where the inside temperature of the furnace is raised to 1425° C. In the melting region the inside temperature of the formed raw material rises for a while, temporarily lowers at point C, and then rises again to reach 1425° C., which is the temperature set. The temperature drop at point C seems to be caused by deprivation of heat by latent heat involved in melting of reduced iron and, hence, point C can be regarded as a starting point of melting. The starting point of melting is substantially determined by the amount of residual carbon in reduced iron particles. At the starting point of melting, the melting point of such reduced iron particles lowers due to carburizing with such residual carbon and CO gas and, accordingly, the reduced iron melts rapidly. To ensure such rapid melting, it is required that a sufficient amount of carbon for carburizing remain in the reduced iron particles having finished with solid-state reduction. The amount of residual carbon is determined by the proportions of iron ore or the like and carbon material blended in forming the formed raw material. According to the experiments conducted by the inventors of the present invention, it has been found that reduced iron can be rapidly carburized to lower its melting point and caused to melt rapidly in the temperature range of 1300 to 1500° C. if the carbon material is initially blended in an amount such that the amount of residual carbon (i.e., the amount of excess carbon) in the solid-state reduced product assumes not less than 1.5% when the final reduction rate in the solid-state stage reaches substantially 100%, or stated otherwise when the metallization rate reaches 100%. It is to be noted that if the amount of residual carbon in the reduced iron is less than 1.5 %, the melting point of reduced iron does not lower sufficiently due to an insufficient carbon amount for carburizing and, hence, it is required that the temperature be raised to 1500° C. or higher for melting-by-heating.

Pure iron, which is not carburized at all, has a melting point of 1537° C. Accordingly, reduced iron can melt when heated to a temperature higher than that melting point. It is, however, desirable that the operation temperature of a practical furnace be as low as possible so as to mitigate the heat load imposed on the hearth refractories. When the melting point of slag produced as a byproduct is further taken into consideration, the operation temperature is desirably set to about 1500° C. or lower. More specifically, it is desirable that the operation conditions be controlled so that the temperature can be raised by about 50 to 200° C. from the starting point of melting (point C) in the melting stage shown in FIG. 4. This is because the temperature in the carburizing-melting stage is desirably set higher than that in the solid-state reduction stage by about 50 to 200° C., more preferably about 50 to 150° C. for solid-state reduction and carburizing-melting to proceed more smoothly and more efficiently.

In the present invention, it is further desirable that the production conditions be controlled so that the content of carbon in finally-obtained metallic iron may assume 1.5 to 4.5%, more preferably 2.0 to 4.0%. Such a carbon content is substantially determined by the amount of carbon material blended in preparing the formed raw material and the atmosphere control in the solid-state reduction stage. The lower limit of such a carbon content, in particular, is determined by the amount of residual carbon in reduced iron in the last stage of solid-state reduction and the succeeding residence time (namely the amount of carburizing). However, the carbon content of finally-obtained metallic iron can be raised to a value higher than the lower limit of the aforementioned range if the reduction rate in the last stage of solid-state reduction reaches substantially 100% while at the same time residual carbon in an amount of 1.5% is ensured, as described above. It has been further found that the carbon content of finally-obtained metallic iron can be raised to a maximum value, or 4.8% if the amount of residual carbon in reduced iron is 4.0% or more upon completion of the solid-state reduction stage and the carburizing-melting-coalescence is allowed to proceed in the succeeding melting stage. Nevertheless, in ensuring a stabilized continuous operation and higher product quality metallic iron the amount of residual carbon preferably ranges between 1.5% and 4.5%.

As to atmospheric gas, a large quantity of CO is produced by the reaction between iron oxide and carbon material contained in the formed raw material and, hence, the atmosphere present in proximity to the formed raw material is kept highly reducing by virtue of its self-shielding action. However, such a self-shielding action cannot be expected in the last stage of solid-state reduction and the succeeding carburizing-melting stage because the amount of CO gas produced is reduced sharply in these stages.

Figure 5:
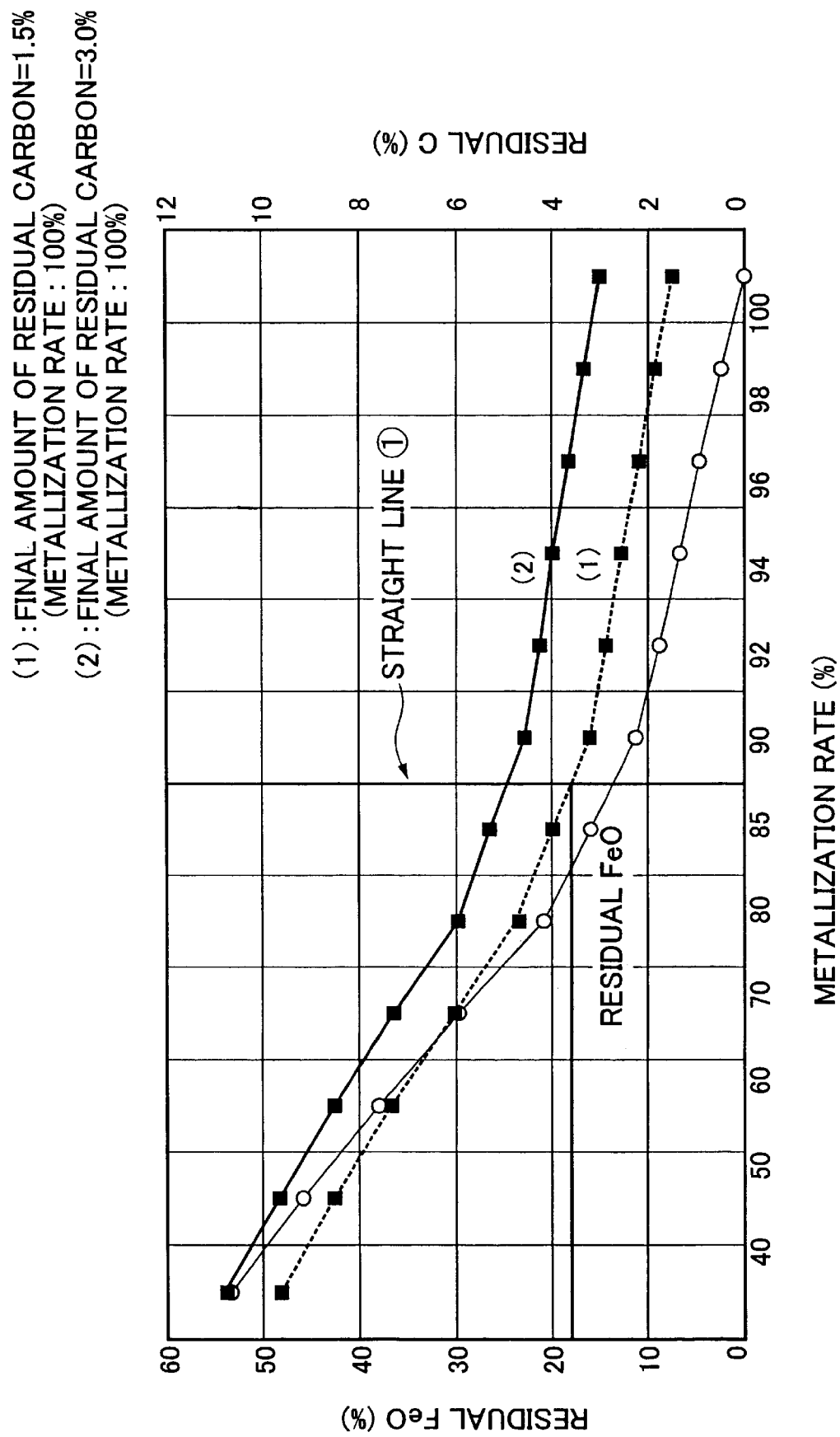
FIG. 5 is also a graph showing respective changes in the metallization rate of iron oxide contained in the formed raw material and the amount of residual FeO throughout the solid-state reduction stage and the melting stage.

FIG. 5 shows the results of determination of the relationship among the metallization rate of a solid-state reduced product, the amount of residual FeO and the amount of residual carbon. As shown, the amount of residual FeO decreased as solid-state reduction proceeded, namely with increasing metallization rate. Solid-state reduction of the formed raw material proceeded in the furnace maintained at 1200 to 1500° C. as shown in FIG. 4 up to straight line ① in FIG. 5, and subsequently carburizing-melting-coalescence of resulting reduced iron proceeded in the melting region in which the atmosphere was rendered highly reducing and the temperature thereof was kept as high as 1350 to 1500° C. by control. The relationship among the metallization rate, the amount of residual FeO and the amount of residual carbon in the latter stage varies correspondingly to the curves appearing rightwardly of straight line ① in FIG. 5.

Curves (1) and (2) in FIG. 5 represent the relationship between the metallization rate and the amount of residual carbon. Specifically, curve (1) appeared in the case where the amount of residual carbon assumed 1.5% at the time 100% metallization was reached, while curve (2) appeared in the case where the amount of residual carbon assumed 3.0% at the time 100% metallization was reached. In practicing the present invention, it is desirable that the amount of carbon material to be blended in preparing the formed raw material be adjusted so that the amount of residual carbon may draw a curve higher than curve (1).

It should be noted that the amount of residual carbon at the time the metallization rate reaches 100% fluctuates slightly due to fluctuations of the reducing degree of the atmospheric gas in the furnace even if a fixed amount of carbon material is blended in preparing the formed raw material. It is, therefore, recommended that the blending amount of carbon material be adjusted according to the reducing degree of the atmospheric gas in the operation of the furnace every time the formed raw material is prepared. In any case, the amount of carbon material to be blended has to be adjusted so that the final amount of residual carbon at the time the metallization rate reaches 100% assumes 1.5% or more.

Figure 6:
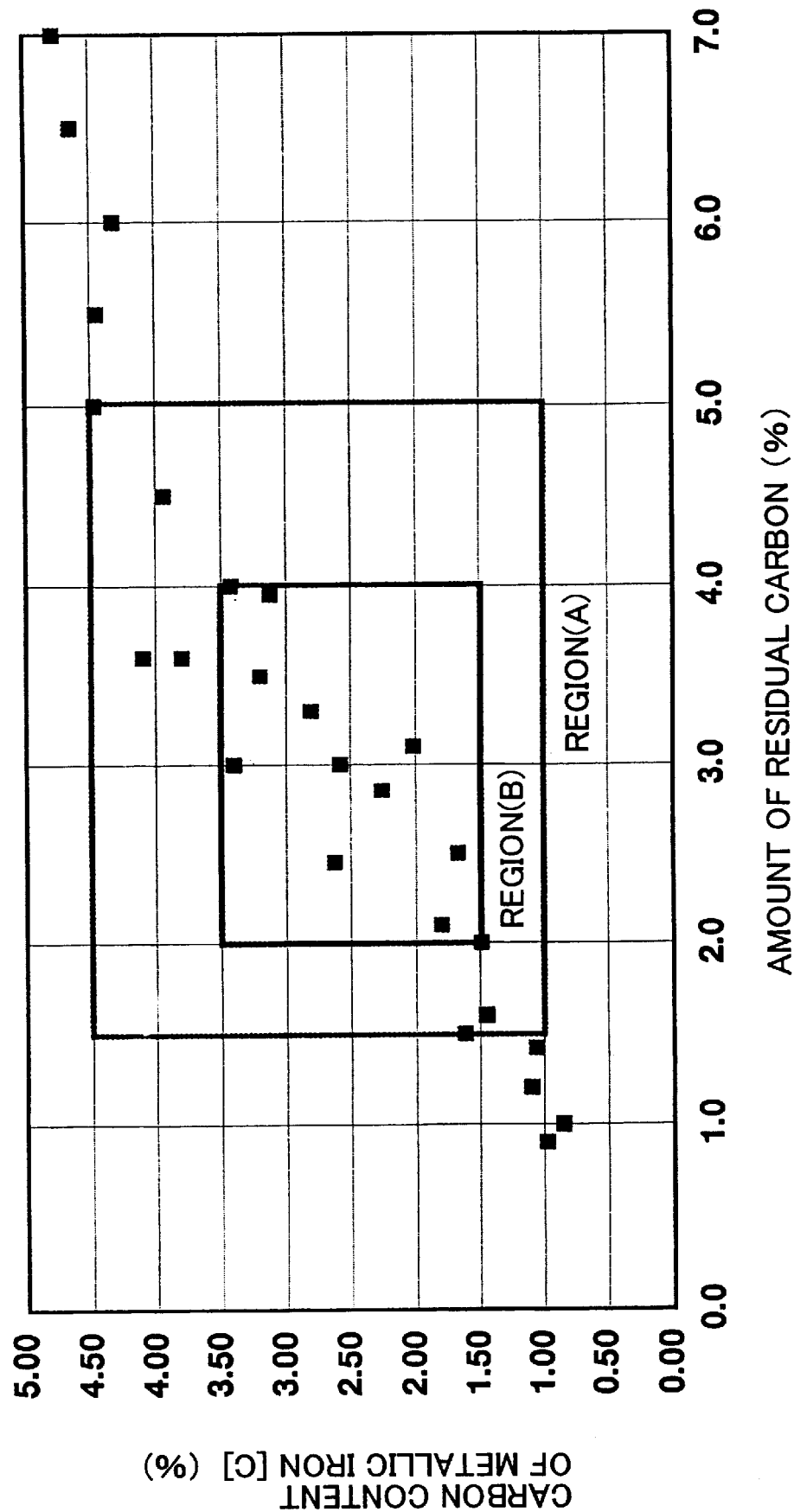
FIG. 6 is a graph showing the relationship between the amount of residual carbon in reduced iron at the time when the metallization rate reached 100% and the amount of residual carbon in metallic iron finally obtained.

FIG. 6 shows the results of determination of the relationship between the final amount of residual carbon at 100% metallization and the C content of resulting metallic iron. As shown in FIG. 6, when the amount of residual carbon was within the range between 1.5% and 5.0%, the C content of resulting metallic iron within the range between 1.0% and 4.5% was ensured, while when the amount of residual carbon was within the range between 2.0% and 4.0%, the C content of resulting metallic iron within the range between 1.0% and 4.5% was ensured.

Figure 7:
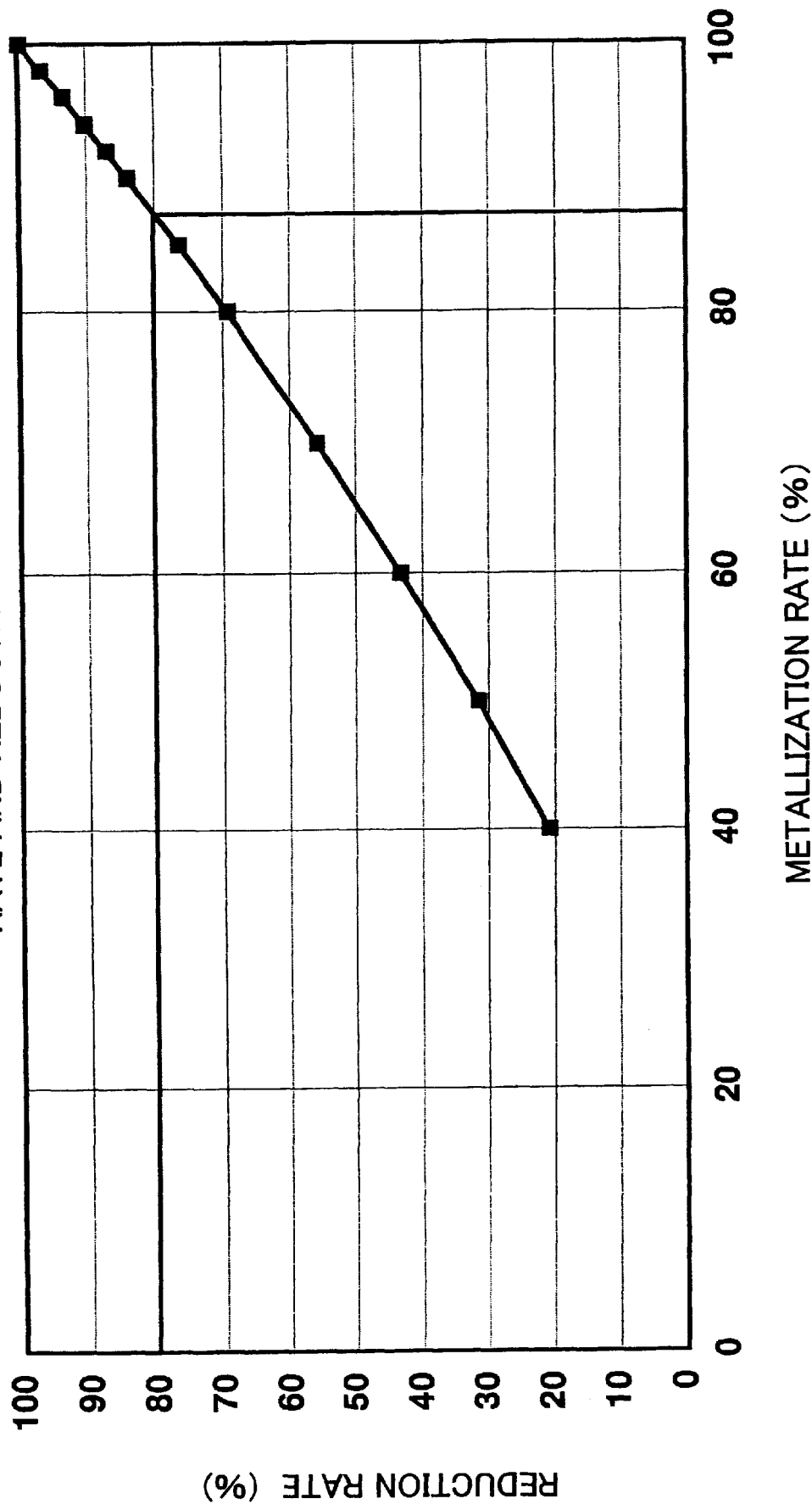
FIG. 7 is a graph showing the relationship between the metallization rate and the reduction rate.

In the above description, two indications, namely the metallization rate and the reduction rate, are used to represent a reduced state of FeO. These indications have respective definitions noted below, and the relationship therebetween can be represented by, for example, the graph shown in FIG. 7. While the relationship between the two varies depending upon the kind or brand of iron ore to be used as an iron oxide source, FIG. 7 shows the relationship between the metallization rate and the reduction rate in the case where magnetite ($Fe_3O_4$) was used as an iron oxide source.

Metallization rate=[resulting metallic iron/(resulting metallic iron+ iron contained in iron ore)]×100 (%)

Reduction rate=(amount of oxygen removed in the reduction process/amount of oxygen in iron oxide contained in formed raw material)×100 (%)

In the reduction melting furnace used in the practice of the present invention, heating by burner is employed to heat the formed raw material, as described above. As also described with reference to FIG. 4, since a large quantity of CO gas and a small quantity of $CO_2$ result from the reaction between the iron oxide source and carbon material contained in the formed raw material charged into the furnace, the atmosphere present in proximity to the formed raw material is kept sufficiently reducing by the shielding effect of the CO gas emitted from the formed raw material in the solid-state reduction.

However, such a self-shielding action is weakened due to a rapid decrease in the amount of CO gas produced in the period from the middle to the last stage of the solid-state reduction stage and, therefore, the atmosphere becomes likely to be influenced by exhaust gas (oxidizing gas including $CO_2$, $H_2O$ or the like) resulting from combustion by burner. Consequently, metallic iron, which has been reduced all the way, becomes susceptible to re-oxidation. In the stage following the completion of solid-state reduction, melting and coalescence of fine reduced iron particles proceed due to lowering of the melting point of reduced iron caused by carburizing with residual carbon contained in the formed raw material. In this stage also, the self-shielding effect is poor and, hence, reduced iron is susceptible to re-oxidation.

Accordingly, it is important to appropriately control the composition of the atmospheric gas in the carburizing-melting region in minimizing such re-oxidation while allowing carburizing-melting-coalescence to proceed efficiently after solid-state reduction.

Then, study has been made to determine atmospheric conditions that allow carburizing-melting to proceed efficiently while preventing reduced iron from being re-oxidized in the carburizing-melting stage following the completion of solid-state reduction.

The results of the study are described below with reference to FIG. 8. In the experiment of this study, a box-shaped electric furnace was used, a powdery or granular carbonaceous material was used as an atmosphere adjusting agent in the carburizing-melting stage, and a method was adopted of keeping a highly reducing atmosphere in the carburizing-melting stage by spreading the carbonaceous material over the hearth to form a layer having an appropriate thickness.

More specifically, different types of granular coal having different grain sizes used as the atmosphere adjusting agent were each spread over an alumina tray to a thickness of about 3 mm and 50 to 60 pieces of formed raw material each having a diameter of about 19 mm were placed in row thereon, one of these pieces being provided with a thermocouple. The tray bearing the formed raw material was charged into the box-shaped electric furnace to measure the temperature of the formed raw material under heating and determine the composition of gas produced for the analysis of the likelihood of re-oxidation of resulting metallic iron. The temperature of the electric furnace was set to reach about 1450° C. at the highest, while the initial composition of the atmospheric gas in the furnace was $CO_2$: 20% and $N_2$: 80%.

Figure 8:
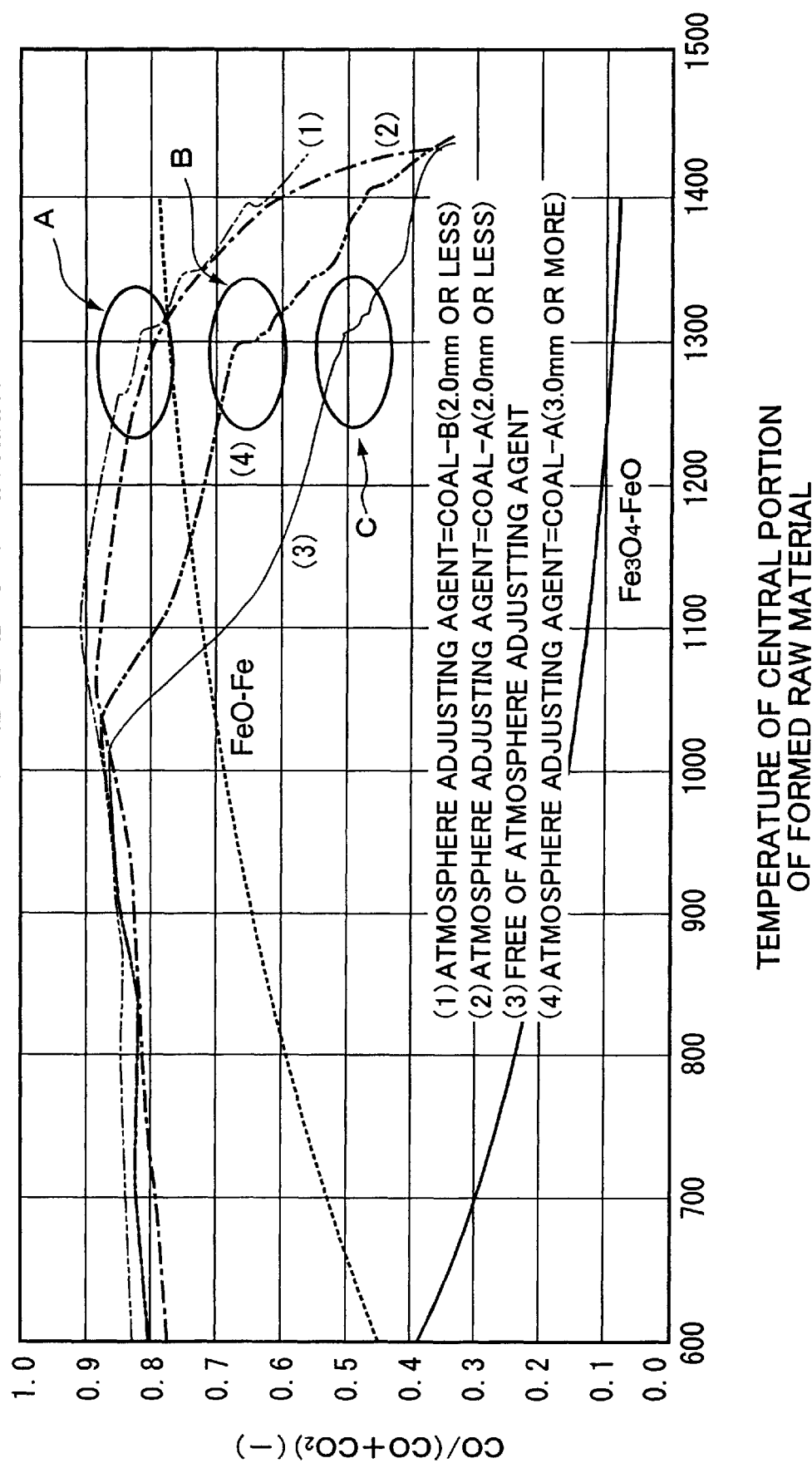
FIG. 8 is a graph showing respective changes in the temperature inside a formed raw material and the reducing rate of the atmospheric gas with or without use of coal powder as an atmosphere adjusting agent.

FIG. 8 shows the results of measurement with time of the temperature of the formed raw material detected by the thermocouple and determination of the composition of the atmospheric gas as the temperature in the furnace was gradually raised. In FIG. 8, the abscissa represents the temperature, and the ordinate represents the simple reducing degree [$CO/(CO+CO_2)$] of the atmospheric gas. In this drawing are plotted the results of four experiments. Specifically, plot (3) represents the results obtained in the case where any atmosphere adjusting agent was not used; plot (4) represents the results obtained in the case where coarse granular coal having a mean particle diameter of not less than 3.0 mm was used as the atmosphere adjusting agent; and plots (1) and (2), respectively, represent the results obtained in the cases where fine coal powders A and B each having a particle diameter adjusted to 2.0 mm or less. FIG. 8 also shows FeO—Fe equilibrium curve and $Fe_3O_4$—Fe equilibrium curve as measures of likelihood of re-oxidation. In FIG. 8, encircled regions each represent the time at which carburizing-melting-coalescence subsequent to substantial completion of solid-state reduction started in each experiment. Control of the atmospheric gas at such a time is most important in the present invention.

As apparent from FIG. 8, in the case represented by plot (3) where any atmosphere adjusting agent was not used, region (C) at which carburizing-melting-coalescence started is located considerably lower than the FeO—Fe equilibrium curve. This means that reduced iron wholly melted with partial smelting reduction occurring. Though metallic iron is produced even in this case, the occurrence of smelting reduction not only causes molten slag to seep from the formed raw material but also produces molten FeO which in turn causes heavy erosion or wear of the hearth refractories, thus resulting in hindrances in a practical production, as described above.

In the cases represented by plots (1) and (2) where the coal powders having finer particles were used, in contrast, the reducing degree of the atmospheric gas was markedly improved, and region (A) at which carburizing-melting-coalescence of reduced iron started is located above the FeO—Fe equilibrium curve and kept in a zone in which production of FeO cannot occur. In the case represented by plot (3) where coarse granular coal was used, region (B) at which carburizing-melting-coalescence started is located slightly lower than the FeO—Fe equilibrium curve. This means that slight re-oxidation might occur in this region. However, analysis of the components of resulting metallic iron revealed that re-oxidation had scarcely occurred.

Figure 27:
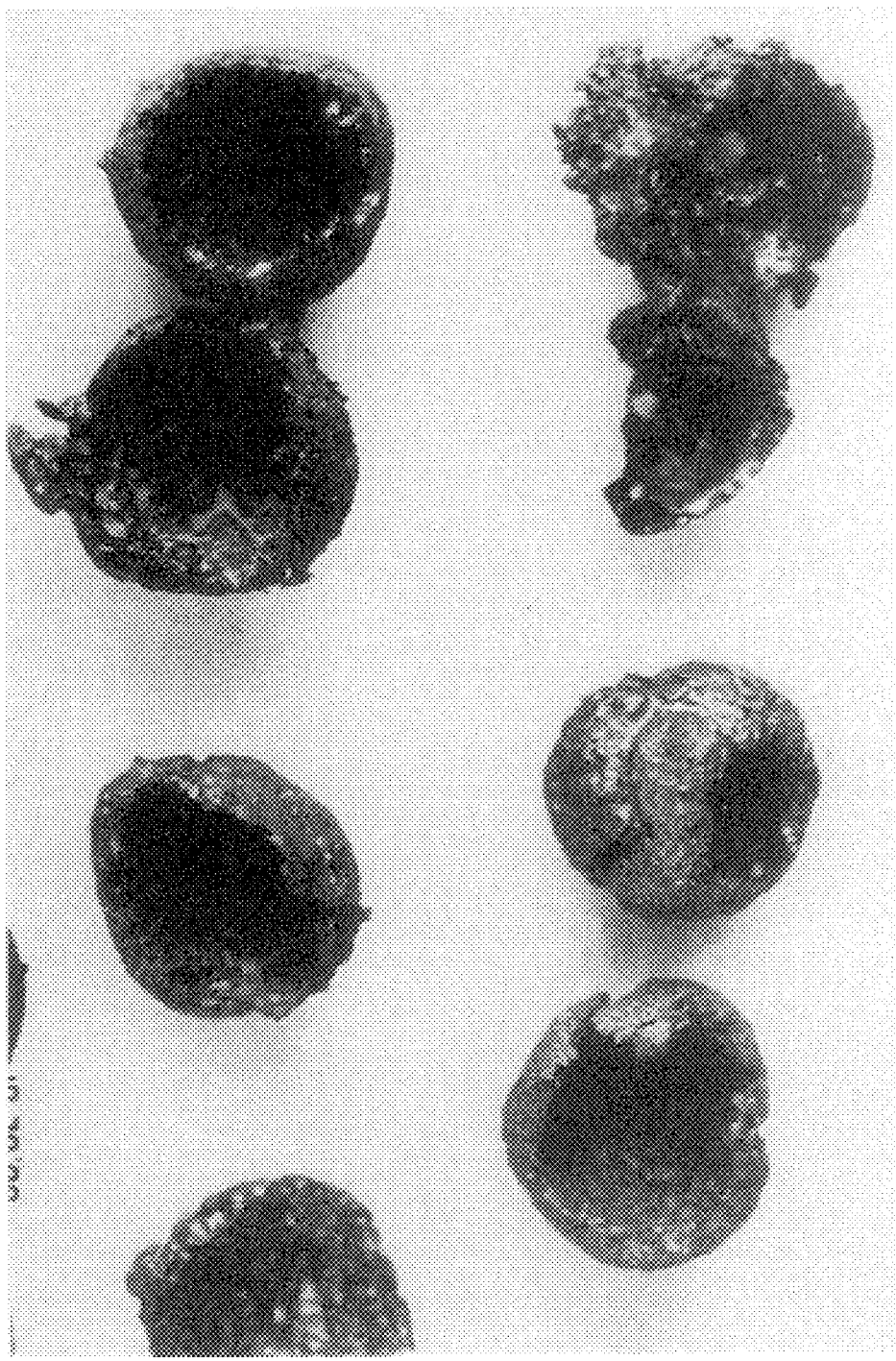
FIG. 27 is a photograph showing the state of metallic iron resulting when an atmospheric gas present in proximity to a formed raw material had a reducing degree of less than 0.5 in the carburizing-melting-coalescence stage.

Thus, it has been confirmed that carburizing-melting-coalescence of reduced iron resulting from solid-state reduction can be allowed to proceed smoothly without causing its re-oxidation thereby efficiently producing metallic iron having a high Fe purity if the atmospheric gas is controlled to have a reducing degree of not less than 0.5, preferably not less than 0.6, more preferably not less than 0.7, most preferably higher than the FeO—Fe equilibrium curve at least in the beginning of the carburizing-melting-coalescence stage. It should be noted that though there is a fear of substantial re-oxidation at a simple reducing degree of 0.5 to 0.7 when the experimental data is analyzed as it is, this experiment was conducted to determine the simple reducing degree of the atmospheric gas and it is presumed that re-oxidation does not occur in the atmospheric gas having a reducing degree of 0.5 to 0.7 actually measured because the atmosphere actually present inside and in proximity to the formed raw material must be kept highly reducing by the presence of residual carbon in the formed raw material and the atmosphere adjusting agent and further because oxidizing gases such as $CO_2$ and $H_2O$ coming from the atmosphere present above the hearth toward the formed raw material is immediately reduced by the atmosphere adjusting agent of carbonaceous material. When the reducing degree is less than 0.5, metallic iron is likely to re-oxidize as shown in FIG. 27 to be explained later, while at the same time carburizing is hard to proceed and, hence, coalescence of metallic iron into grains is hard to proceed, thus resulting in shell-like iron grains partially containing slag as entangled therein. Since such a product has a lower Fe purity and a degraded shape quality, the object of the present invention cannot be attained.

Though the reducing degree of the atmospheric gas rapidly lowers after the completion of carburizing-melting-coalescence of reduced iron, molten and coalesced metallic iron is substantially completely separated from slag produced as a byproduct at this time in an actual production and hence is hardly affected by such a drop in the reducing degree of the atmospheric gas. When such molten metallic iron is solidified by cooling, granular metallic iron of a high iron grade can be obtained efficiently.

As apparent from the above description, coal powder used as the atmosphere adjusting agent preferably has a particle diameter as fine as 3 mm or less, more preferably as fine as 2 mm or less since such fine coal powder can inhibit re-oxidation in the carburizing-melting-coalescence stage more reliably. When the yield and the operability of the furnace in a practical production and the like are further taken into consideration, the most preferable range of the particle diameter of such coal powder is between 0.3 mm and 1.5 mm. Though there is no particular limitation to the thickness of the layer of coal powder to be spread over the hearth, the thickness is preferably about 2 mm or more, more preferably 3 mm or more because the absolute quantity of coal as the atmosphere adjusting agent becomes insufficient if the layer of coal powder is too thin. Though there is no particular limitation to the upper limit of the layer thickness, the upper limit of the layer thickness is preferably about 7 mm or less, more preferably about 6 mm or less from the practical point of view because the atmosphere adjusting action of the atmosphere adjusting agent naturally becomes saturated and, hence, an excess in the layer thickness is wasteful. Any CO producing source such as cork or charcoal may be used instead of coal as the atmosphere adjusting agent. Such CO producing sources may be used either alone or as a mixture.

Flammable gas such as natural gas, COG gas, methane gas and the like can be used as the atmosphere adjusting agent. In this case, the reduction rate can be adjusted by introducing the gas proximity to the formed raw material during a last stage of the solid-state reduction to the carburizing-melting-coalescence stage.

The atmosphere adjusting agent may be spread over the hearth before the formed raw material is charged into the furnace. In this case the atmosphere adjusting agent also serves to protect the hearth refractories against molten slag which may seep due to fluctuations of the operation conditions in the reduction melting process. Of course, it is also effective that the atmosphere adjusting agent is charged onto the hearth from above just before the starting of carburizing-melting of the formed raw material since the atmosphere adjusting agent is expected to exert such a protecting action in the carburizing-melting-coalescence stage following the completion of solid-state reduction.

In addition, the gas which generates reducing gas or reducing gas, such as a natural gas, COG gas and methane gas, can also be used as an atmosphere adjusting agent. In this case, it is desirable to supply means in the partition wall, and to supply a gas from the partition wall end. Thereby, the gas supply means can be easily protected from the high temperature atmosphere in the furnace and reducing gas can be certainly supplied near the hearth.

There is no particular limitation to the manner of charging the atmosphere adjusting agent. However, when a pipe-shaped supply is, it may be difficult to supply the auxiliary raw materials onto the hearth to an even thickness continuously.

Accordingly, it is recommended in the present invention that a feed device for charging the auxiliary raw materials such as the atmosphere adjusting agent onto the hearth be improved so as to supply the auxiliary raw materials by using a duct vertically connecting with the ceiling portion of the furnace. Preferably, such a feed device is configured to allow the auxiliary raw materials to fall by gravity down to the hearth through the duct. Use of such a duct makes it possible to form on the hearth a thin layer of the atmosphere adjusting agent having an even thickness in the widthwise direction of the hearth thereby overcoming the problem that the auxiliary raw materials are charged unevenly in the widthwise direction of the hearth. The atmosphere adjusting agent thus evenly charged can effectively exhibit its re-oxidation preventive effect.

However, the distance between the hearth and the duct outlet is preferably 300 mm or less, more preferably 200 mm or less for avoiding adverse effect on the even thickness supply of the materials onto the hearth (disturbance of the falling passageway of the materials) brought by a flow of the atmospheric gas in the furnace therebetween. If the duct outlet is extending too close to the hearth, the velocity of the flow of the atmospheric gas in this portion becomes too fast which may be resulted in splashing auxiliary raw materials. Accordingly, taking enough distance between the hearth and the duct outlet is recommended for decreasing the velocity of the flow of the atmospheric gas to meet terminal velocity of the materials at the most.

Figure 9:
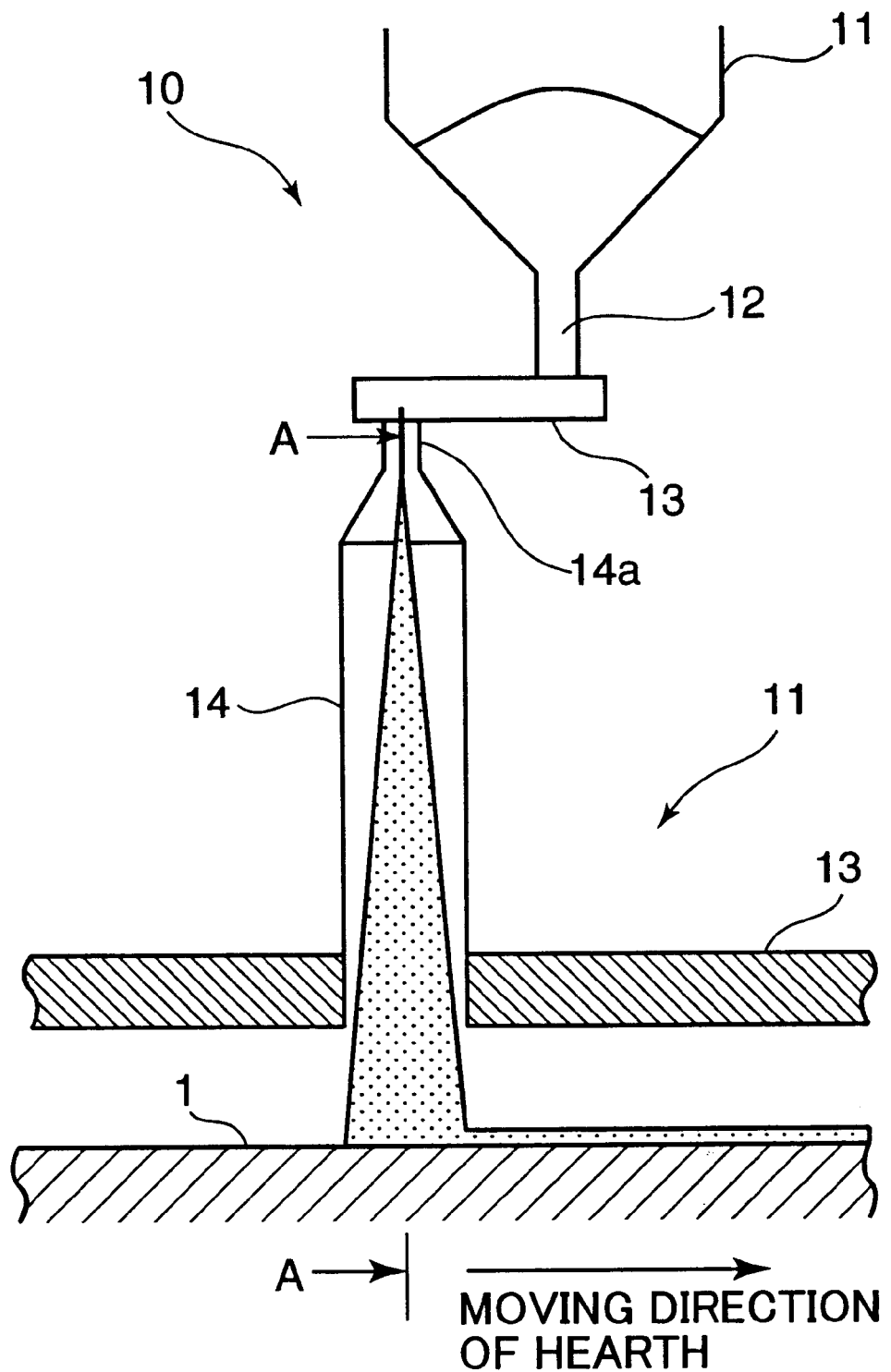
FIG. 9 is a schematic sectional view illustrating the structure of a principal part of a moving hearth type furnace according to one preferred embodiment of the invention.

Supply of the atmosphere adjusting agent as an auxiliary raw material using one preferred embodiment of a feed device according to the present invention is described below with reference to FIGS. 9 to 14 schematically showing the embodiment. FIG. 9 is a schematic view showing an atmosphere adjusting agent charging portion in a moving hearth type furnace.

Feed device 10 comprises a supply hopper 11, and a discharging duct 12 through which the atmosphere adjusting agent is supplied from the supply hopper 11 to a feeder 13 serving as supply regulating means. There is no particular limitation to the construction of the feed device 10. Though the feeder 13 in FIG. 9 is illustrated as a vibrating feeder configured to regulate the supply of the atmosphere adjusting agent by varying the amplitude of vibration, there is no particular limitation to such a vibrating feeder, for example, a drum feeder may be used.

A supply duct 14 as means for supplying the atmosphere adjusting agent from the feed device 10 to hearth 1 vertically connects between a supply port 14a of the feeder 13 and an opening defined in a ceiling portion of the furnace. When the atmosphere adjusting agent falling through the duct 14 contacts the inner wall of the duct 14, the atmosphere adjusting agent may adhere to such a contacted portion of the inner wall and, hence, uneven supply of the atmosphere adjusting agent onto the hearth may result. For this reason, the duct 14 is required to connect vertically with the ceiling portion of the furnace for the atmosphere adjusting agent to be evenly supplied onto the hearth.

For the atmosphere adjusting agent to be spread evenly in the widthwise direction of the hearth (in the direction perpendicular to the moving direction of the hearth), the width of the duct 14 is preferably equal to that of the hearth. Alternatively, several ducts each having any width may be used so that the total width thereof is equal to the width of the hearth. In this case each duct may be of an independent type which can be removably mounted independently, or the duct 14 is partitioned with a partition member 15 provided therein so as to allow the atmosphere adjusting agent to fall through each partitioned duct. Though there are shown three partition panels 15 in FIG. 10, the number of partition panels 15 is not particularly limited and may be determined depending upon the width of each duct.

The atmosphere adjusting agent supplied to the supply hopper 11 is mixed with other additives as required, and then supplied to the vibrating feeder 13 through the discharging duct 12. The vibrating feeder 13 supplies the atmosphere adjusting agent into the furnace through the supply port 14a and the supply duct 14 while regulating the supply rate thereof. In this case independent ducts 14 preferably have respective supply ports 14a each provided with vibrating feeder 13 for regulating the supply of the atmosphere adjusting agent. Particularly in a furnace of the rotary hearth type, a continuous layer of the atmosphere adjusting agent having an even thickness in the widthwise direction of the hearth can be formed by controlling each vibrating feeder 13 to vary the supply of the atmosphere adjusting agent.

Further, if the duct 14 is partitioned into plural divisions in the widthwise direction of the hearth, a flow of gas in the furnace that penetrates upwardly into the duct 14 can be prevented from expanding in the widthwise direction of the hearth. Since the atmosphere adjusting agent that is falling has a falling inertia force, the falling passageway thereof is not disturbed by such a flow of gas rising in the duct 14. Accordingly, the atmosphere adjusting agent falls substantially along an extension of the passageway of its falling by gravity without leaning to one side in the duct and, hence, the resulting layer of the atmosphere adjusting agent is continuous and does not lean to one side in the widthwise direction of the hearth.

The feed device thus constructed is capable of forming a continuous layer of the atmosphere adjusting agent having an even thickness on the hearth without requiring the provision of a pellet leveler or a smoother.

It is desirable that an inert gas such as nitrogen gas be supplied from an upper portion of the duct so as to depress a rising flow of the atmospheric gas into the duct 14. A downward flow of such a supplied inert gas in the duct can depress a rising flow of the atmospheric gas from the inside of the furnace while reducing disturbance of the falling passageway of the atmosphere adjusting agent, thereby ensuring more effective formation of the layer of the atmosphere adjusting agent having an even thickness.

Figure 11:
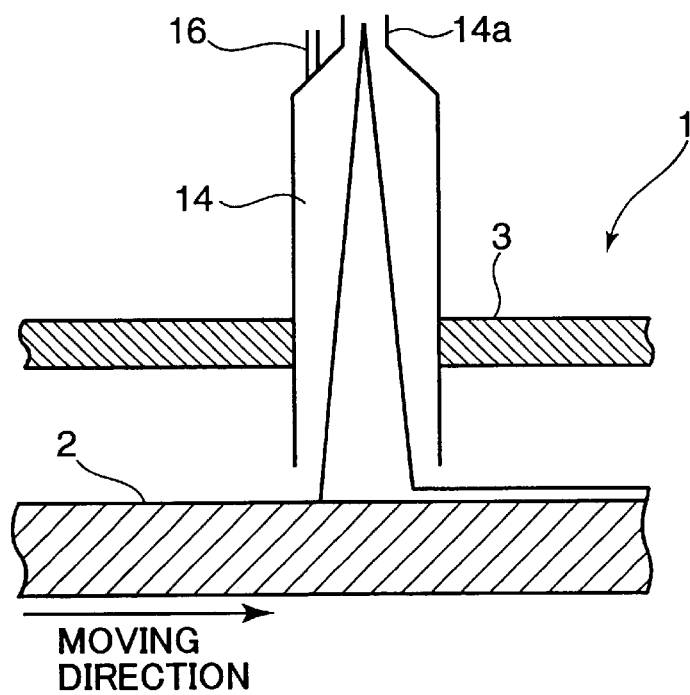
FIG. 11 is a view illustrating a principal part of another preferred feed device according to the present invention.

Though there is no particular limitation to the location at which the inert gas is supplied, at least one gas supply port 16 oriented inwardly of the duct 14 as shown in FIG. 11 is preferably provided from the viewpoint of depressing a rising flow of the atmospheric gas into the duct 14. In this case the leading end portion of the gas supply port 16 is desirably oriented toward the hearth (vertically downward) for the inert gas to be introduced.

There is no particular limitation to the amount of the inert gas to be supplied so long as the inert gas is supplied in an amount required to depress a rising flow of the atmospheric gas into the duct 14. The amount of the inert gas to be supplied may be appropriately adjusted by, for example, providing the gas supply port 16 with a flow control valve (not shown).

Figure 12:
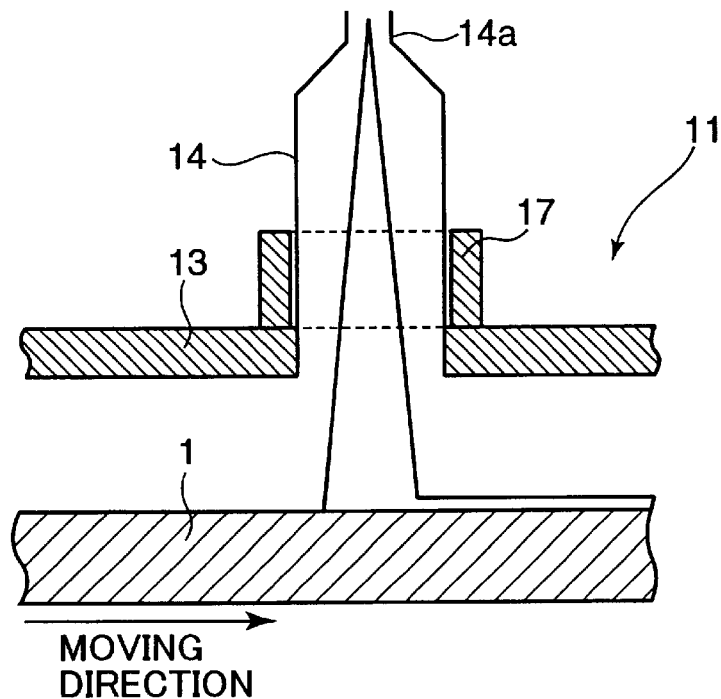
FIG. 12 is a view illustrating a principal part of another preferred feed device according to the present invention.

Further, it is desirable that cooling means be provided on the outer wall of the duct 14 for preventing the auxiliary raw material such as the atmosphere adjusting agent that is falling within the duct 14 from adhering to the inner wall of the duct 14. The location of the cooling means is not particularly limited, for example, the duct may be entirely or partially provided with the cooling means. It is, however, desirable that a cooling jacket 17 be provided in a lower portion of the duct as shown in FIG. 12 because such an arrangement makes it possible to prevent the atmosphere adjusting agent from adhering to an inner wall portion of the duct situated adjacent the opening of the ceiling of the furnace more effectively.

Figure 13:
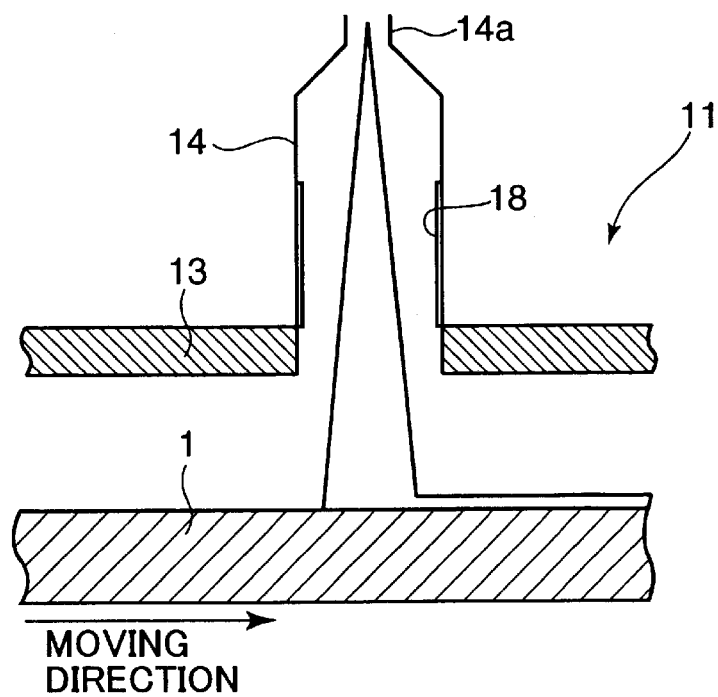
FIG. 13 is a view illustrating a principal part of another preferred feed device according to the present invention.
Figure 14:
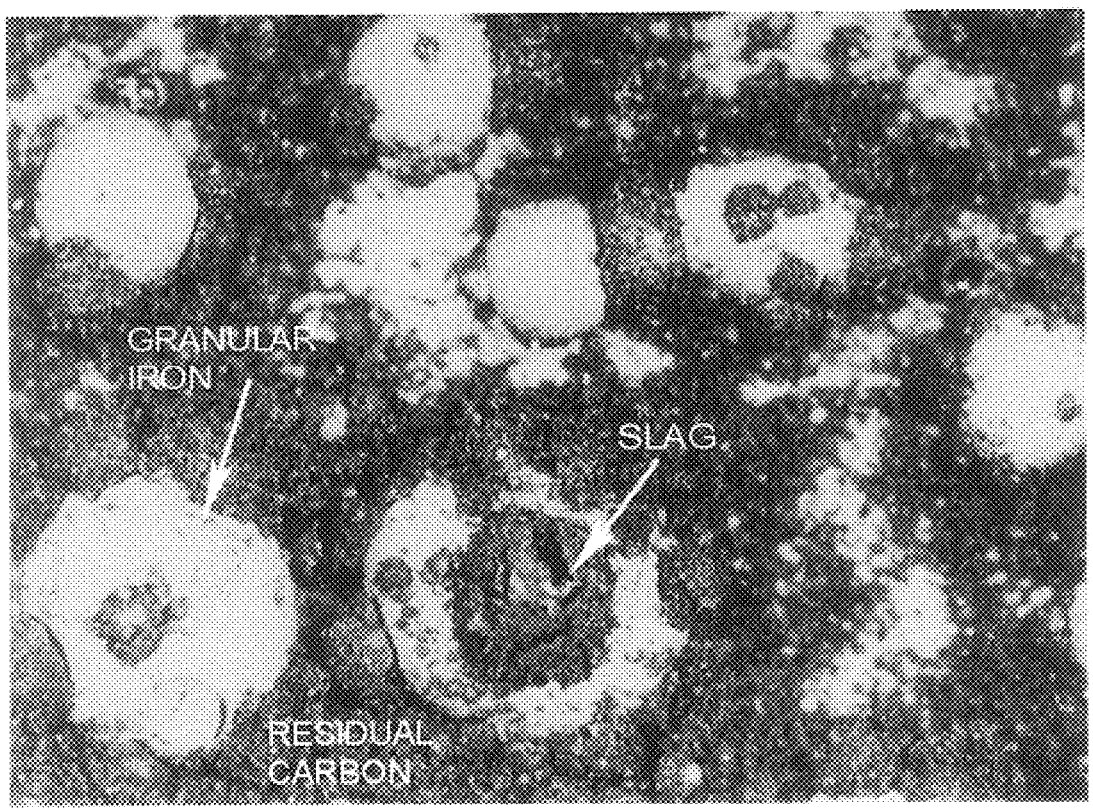
FIG. 14 is a photograph showing metallic iron and slag in a state immediately after carburizing-melting in an experimental production.

Adherence or deposition of the auxiliary raw materials such as the atmosphere adjusting agent can more effectively be prevented by coating the inner wall of the duct with an anti-adhesion agent that can prevent adherence or deposition of such auxiliary raw materials. For example, an anti-adhesion agent layer 18 made of a fluoroplastic as shown in FIG. 13 may be formed. The location and the thickness of the anti-adhesion agent layer are not particularly limited. Though the inner wall of the duct may be entirely or partially formed with such an anti-adhesion agent layer, the anti-adhesion agent layer is desirably formed on a lower portion of the duct that will be heated to a higher temperature.

The feed device having the foregoing features according to the present invention may be used to charge other auxiliary raw materials such as a melting point adjusting additive to be described later and an oxide material composed chiefly of alumina for forming a primary protective layer, as well as the atmosphere adjusting agent. The form of such an auxiliary raw material is not limited to powder. The auxiliary raw material may be in a small-size pellet form or a ground form which have a larger particle size than a powder form. And also, the feed device according to the present invention may be used to charge the raw material (e.g. powdery raw material).

One characteristic feature of the present invention consists in that the reducing degree of the atmospheric gas is raised particularly in the carburizing-melting stage thereby preventing re-oxidation of reduced iron and allowing carburizing-melting to proceed efficiently. For a series of processes from solid-state reduction to the completion of carburizing-melting-coalescence to proceed efficiently, it is desirable that the temperature and the atmospheric gas in each stage be appropriately controlled.

Specifically, the temperature in the solid-state reduction stage is preferably maintained within the range between 1200° C. and 1400° C. so as not to produce molten FeO by a smelting reduction reaction, while the temperature in the carburizing-melting-coalescence stage is desirably maintained within the range between 1300° C. and 1500° C. More preferably, the temperature in the solid-state reduction stage is controlled so as to be lower than the temperature in the carburizing-melting-coalescence stage by 50 to 200° C.

Control over the conditions of the atmospheric gas is not required so much in the solid-state reduction stage because the atmospheric gas is kept high reducing by a large quantity of CO gas produced by combustion of carbon material contained in the formed raw material in this stage. In the carburizing-melting-coalescence stage and thereafter, however, proper control of the atmospheric gas in the furnace is critical because the amount of CO gas produced from the formed raw material is largely reduced and re-oxidation by oxidizing gas produced by burner combustion is likely.

For the temperature and the composition of the atmospheric gas to be properly adjusted in accordance as each proceeding stage of the reduction melting process, the reduction melting furnace desirably has a structure partitioned into two or more divisions with a partition wall in the moving direction of the hearth as described above with reference to FIGS. 1 to 3. The division on the upstream side and the division on the downstream side are used as a solid-state reduction division and a carburizing-melting-coalescence division, respectively, for allowing control of the temperature and the composition of the atmospheric gas in each division independently of the other division. Though FIG. 3 illustrates an exemplary furnace partitioned into four divisions with three partition walls to allow more precise control of the temperature and the composition of the atmospheric gas, it is possible to vary the number of divisions as desired depending upon the scale or the structure of reduction melting equipment used.

Metallic iron obtained by the method described above is substantially free of any slag component and has a very high purity of Fe. Usually, such metallic iron is delivered to existing steelmaking equipment such as an electric furnace or a converter and used as an iron source. In using such metallic iron as a raw material of steel the content of sulfur (S) therein is desirably reduced as much as possible. Further study has been made to reduce the S content of iron ore or carbon material in the metallic iron producing process in pursuit of metallic iron having a lower S content.

As a result, it has been discovered that the S content of finally obtained metallic iron can be reduced to 0.10% or less, more specifically about 0.05% or less by intentionally blending a CaO source (including quick lime, slaked lime, calcium carbonate or the like) in the raw material in forming the formed raw material comprising iron ore and carbon material so that the basicity ($CaO/SiO_2$ ratio) of the total of all the slag forming components including such slag forming components as gangue components contained in the iron ore assumes a value in the range of 0.6 to 1.8, more preferably 0.9 to 1.5.

Coal, most typically used as a carbonaceous reducing agent, usually contains about 0.2 to 1.0% of S and the most part of such an S content will be incorporated into metallic iron. In the case where such basicity adjustment by intentional addition of the CaO source is not performed, the basicity calculated from the slag forming components contained in the formed raw material is generally 0.3 to less though the basicity varies depending upon the kind or brand of the iron ore or a like factor. With such low basicity slag, inclusion of S (sulfurization) into metallic iron in the solid-state reduction stage or in the succeeding carburizing-melting-coalescence stage is unavoidable and about 85% of the total S content in the formed raw material is incorporated into the metallic iron. This results in finally obtained metallic iron having an S content of 0.1 to 0.2%, which is very high, and hence having a degraded quality as a finished product.

However, it has been discovered that if the basicity of the slag forming component is adjusted to a value within the range of 0.6 to 1.8 by intentionally adding the CaO source in forming the formed raw material as described above, fixation of S in slag produced as a byproduct in the solid-state reduction stage and the carburizing-melting-coalescence stage occurs with the result that the S content of resulting metallic iron can be largely reduced.

The mechanism of lowering the S content seems to be such that S contained in the formed raw material reacts with CaO to produce CaS (CaO+S=CaS), which is fixated in slag. In the conventional art situation in which the reduction melting mechanism according to the present invention has not been clarified, it has been considered that desulfurization by addition of CaO as in a typical hot metal desulfurization process cannot be expected in the reduction melting process. According to the discovery by the inventors of the present invention, however, CaO contained in slag captures and fixates S in the process where melting and coalescence of reduced iron and separation of slag are allowed to proceed by carburizing with residual carbon that remains in reduced iron upon completion of solid-state reduction, thereby substantially reducing the S content of resulting metallic iron.

The applicants of the instant application consider that such a mechanism of lowering the S content of metallic iron is different from typical hot metal desulfurization utilizing CaO-containing slag but is a reaction characteristic of the case where the method of the present invention is practiced. Of course, if sufficient contact between molten iron and molten slag as a byproduct under heating is ensured after carburizing-melting of reduced iron, it might be conceived that the ratio of the S content in slag (S%) to the S content in metallic iron [S%], namely the distribution ratio, is determined by the liquid (molten iron)-liquid (molten slag) reaction. In the present invention, however, a slag-metal contact area is very small as can be confirmed by the photograph in FIG. 14 and, hence, there cannot be expected very much the effect of lowering the S content of metallic iron resulting from a slag-metal equilibrium reaction that occurs after the carburizing-melting-coalescence of reduced iron has been completed. Therefore, the desulfurization mechanism based on intentional addition of CaO to the formed raw material according to the present invention is considered to consist of the S-capturing reaction characteristic of CaO occurring in the process where carburizing-melting-coalescence of reduced iron and separation of slag proceed and the sulfurization-preventive action against metallic iron resulting from the S-capturing reaction.

Though the amount of CaO to be added for the basicity adjustment should be determined depending upon the amount and composition of gangue component contained in iron ore or the like, the kind and the amount of carbon material to be blended, and like factors, a standard amount of CaO on a pure CaO content basis to be added in adjusting the basicity of the total of slag forming components to a value within the range of 0.6 to 1.8 is within the range of 2.0 to 7.0%, more preferably 3.0 to 5.0% based on the total amount of the formed raw material. In the case where slaked lime ($Ca(OH)_2$), calcium carbonate ($CaCO_3$) or the like is used, the amount of such a material should meet the above amount on a pure CaO content basis. It has been confirmed that when the basicity of the slag forming component was adjusted to about 0.9 to 1.1 by adding $CaCO_3$ in an amount of, for example, 4% to the formed raw material, an apparent desulfurization rate as high as 45 to 50% can be ensured, and that when the basicity of the slag forming component was adjusted to about 1.2 to 1.5 by adding $CaCO_3$ in an amount of about 6% to the formed raw material, an apparent desulfurization rate as high as 70 to 80% can be ensured. The apparent desulfurization rate is determined by the following formula:

Apparent desulfurization rate (%)=[S content (%) in metallic iron obtained from a formed raw material admixed with CaO/S content (%) in metallic iron obtained from a formed raw material not admixed with CaO]×100

Figure 15:
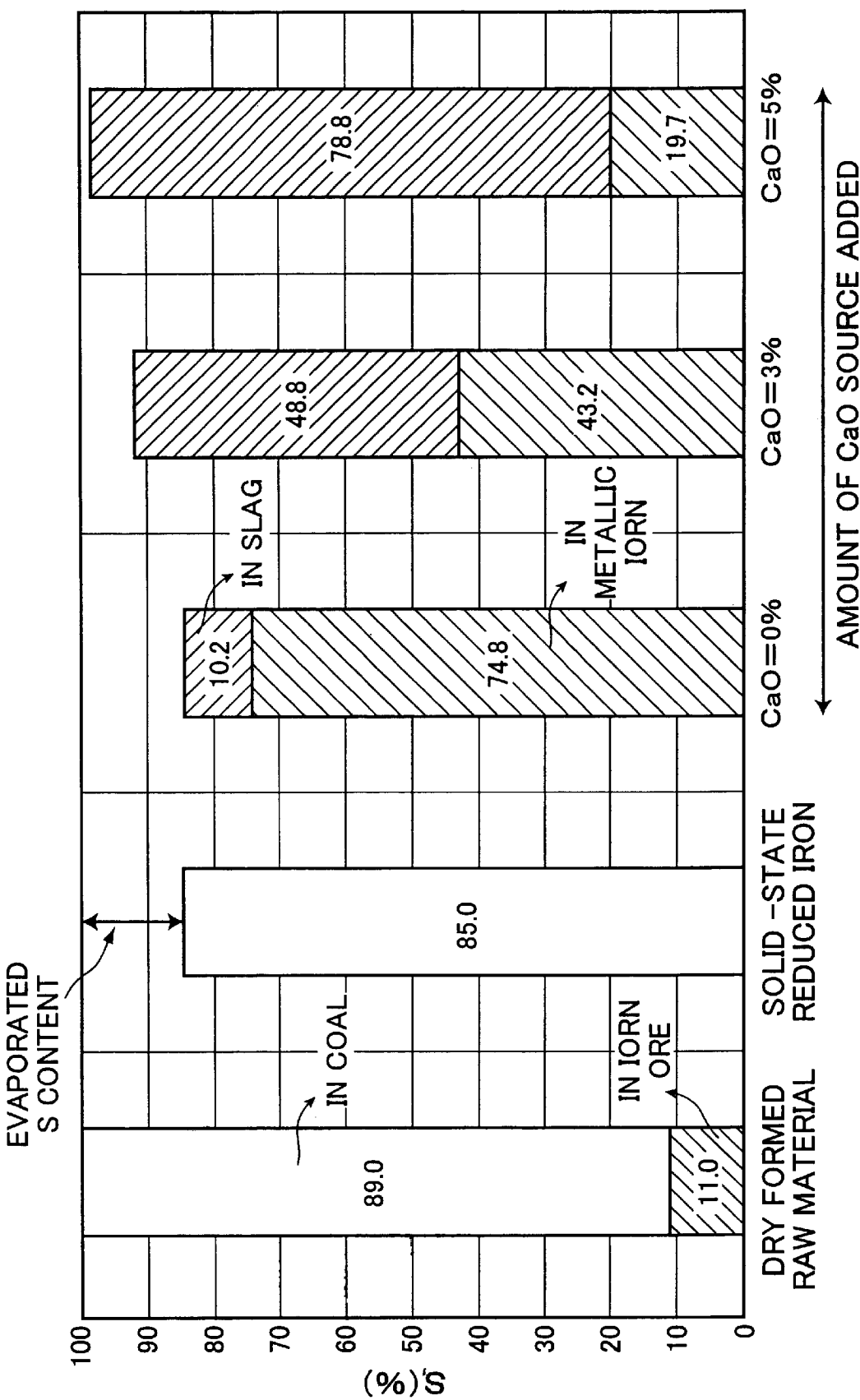
FIG. 15 is a graph proving the effect of lowering the sulfur content of metallic iron in an experiment where a CaO source was intentionally added to the formed raw material to adjust the slag basicity.

The effect of lowering the S content resulting from the addition of CaO is described below by way of experimental data obtained by the use of a box-shaped electric furnace. FIG. 15 shows a change in S content in an experiment where a formed raw material prepared by mixing iron ore, carbon material, a small amount of a binder (bentonite or the like), and an appropriate amount of CaO was used and reduction melting according to the method of the invention was performed.

The bar graph of the dry formed raw material in FIG. 15 indicates that if the S content of the formed raw material before undergoing reduction melting is assumed 100%, about 89% of the S content is contributed from the carbon material and about 11% contributed from the iron ore. When this formed raw material was subjected to reduction melting according to the method of the invention, about 85% of the S content remained in reduced iron upon completion of solid-state reduction described above with reference to FIG. 4 and about 12% of the S content was evaporated off the furnace during the solid-state reduction. When a formed raw material not admixed with any CaO source (the basicity determined from the composition of the slag forming component contained in the formed raw material was 0.165) was used, it was found that 74.8% of the S content was incorporated into finally-obtained metallic iron and 10.2% of the S content was captured by slag.

In contrast, when there was used a formed raw material admixed with 4.5% of a CaO source to adjust the basicity of the slag forming component thereof to 1.15, the amount of S incorporated in metallic iron decreased to 43.2% and the amount of S captured by slag increased to 48.8%, while the amount of S evaporated off the furnace during the production process decreased to about 8%. When there was used a formed raw material admixed with 5.0% of a CaO source to adjust the basicity of the slag forming component thereof to 1.35, the amount of S incorporated in metallic iron decreased to 19.7% and the amount of S captured by slag increased to 78.8%, while the amount of S evaporated off the furnace during the production process decreased to about 1.5%.

Now that the basic experiment using the box-shaped electric furnace confirmed that basicity adjustment by addition of a CaO source is very effective in lowering the S content of metallic iron, a similar experiment using a demonstration furnace was conducted to investigate the quantitative influence of the basicity on the effect of lowering the S content of metallic iron in the case where the slag basicity was differently varied by varying the amount of the CaO source to be added. The results are shown in FIG. 16.

Figure 16:
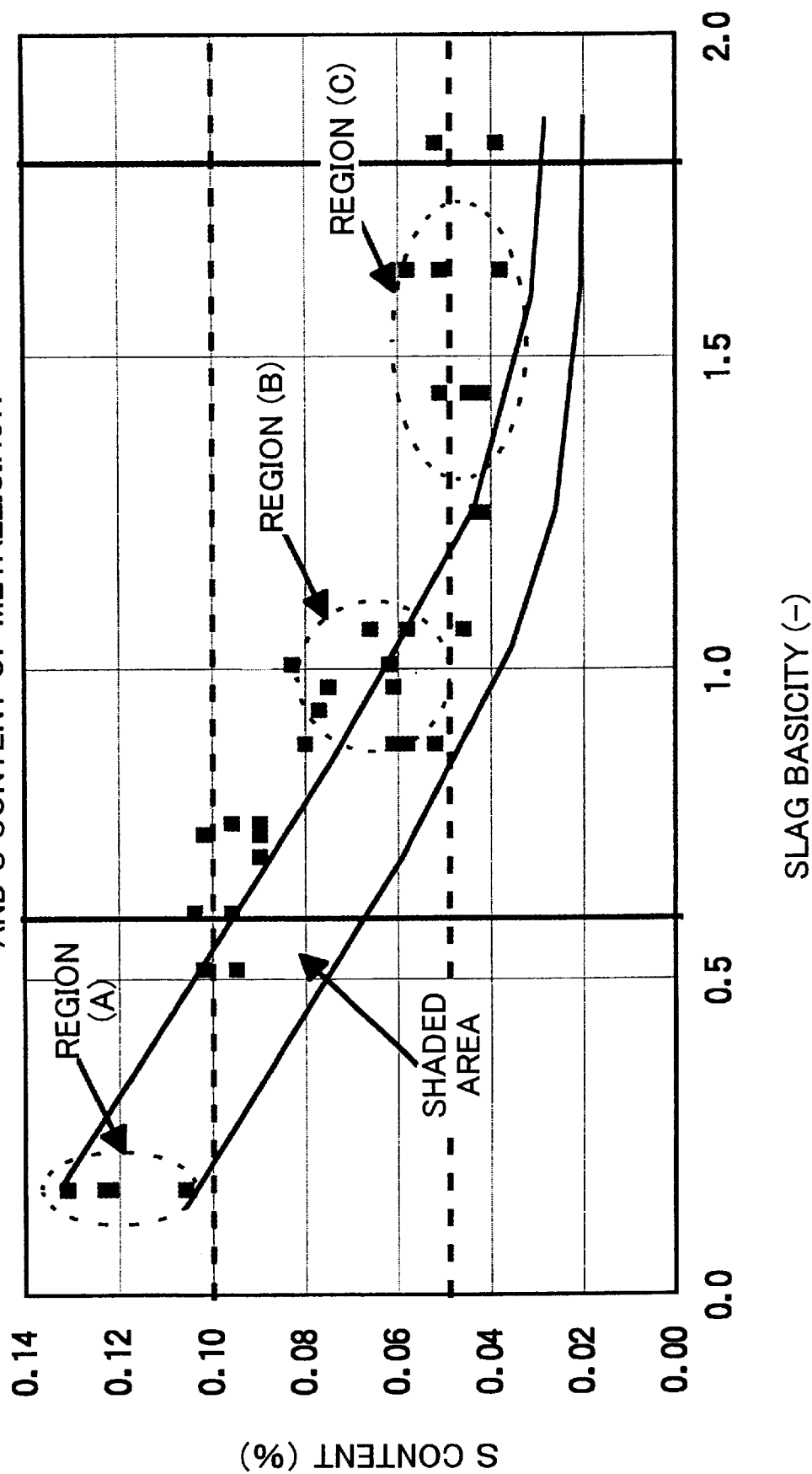
FIG. 16 is a graph showing the relationship between the basicity of slag produced and the sulfur content of resulting metallic iron.

FIG. 16 graphically shows the relationship between the final basicity of slag and the S content of metallic iron which resulted when the amount of the CaO source added was varied, in which each point represents a value found. FIG. 16 also shows the results of the basic experiment using the foregoing box-shaped electric furnace as a shaded area. Since the basic experiment employed an electric heating system in which an inert gas was used as the atmospheric gas, the oxidizing potential of the atmosphere was low, which resulted in an advantage to the apparent desulfurization. In the case where the demonstration furnace utilizing burner combustion for heating, on the other hand, the reducing degree of the atmospheric gas was lower than that in the basic experiment due to exhaust gas produced by combustion and the S content of metallic iron was higher than the result of the basic experiment. However, the tendency of the results obtained in this case was basically and substantially followed the results of the basic experiment. As shown, the S content of metallic iron in region (A) which represents the case where any CaO source was not added at all assumed about 0.120, while the S content of metallic iron in region (B) which represents the case where the basicity was adjusted to about 1.0 decreased to 0.050–0.080% and the apparent desulfurization rate assumed about 33–59%. When the basicity was further increased to 1.5, it was confirmed that the S content in metallic iron was reduced to 0.050% as shown in region (C).

It should be noted that if the CaO source is added until the basicity assumes 1.8 or more, the operation temperature has to be raised excessively due to a rise in the melting point of resulting slag. Such a situation is not preferable because damage to the furnace is accelerated with a disadvantage in fuel economy and further the coalescing property of reduced iron becomes poor, resulting in finer granular metallic iron having a lowered commercial value.

As apparent from these experiments, when an appropriate amount of a CaO source is intentionally added to the formed raw material to raise the basicity of the slag forming component to about 0.6 or more, the S-capturing ability of resulting slag is considerably enhanced thereby to largely reduce the amount of S to be incorporated into metallic iron, thus resulting in metallic iron having a lowered content of S. Further, as described with reference to FIG. 15, the amount of S exhausted from the furnace in the form of $SO_X$ or the like is largely reduced and, hence, the atmospheric pollution due to such exhaust gas can be diminished and the desulfurization duty, which is imposed if such exhaust gas is desulfurized, can be lessened.

In the case where the addition of the CaO source is performed to lower the S content of metallic iron, the melting point of slag produced as a byproduct may be lowered by addition of a certain amount of the CaO source and, hence, seeping of the low-melting-point slag may become likely, which may cause erosion or wear of the hearth refractories. In the practice of the present invention, however, undesirable seeping of such byproduct slag can be minimized since the two-step heating system is adopted in which the temperature conditions of the solid-state reduction stage and the carburizing-melting-coalescence stage are set within the preferable ranges of 1200 to 1400° C. and 1350 to 1500° C., respectively, to allow solid-state reduction to proceed sufficiently at the temperature lower than the melting point of the byproduct slag and then to allow reduction of a partially remaining FeO and carburizing-melting-coalescence of reduced iron to proceed, as described above.

Thus, the present invention makes it possible to obtain granular metallic iron having a very high purity of Fe without causing re-oxidation of reduced iron by adjusting the reducing degree of the atmospheric gas to 0.5 or more, preferably 0.6 or more, more preferably 0.7 or more particularly in the carburizing-melting stage in the production of metallic iron in which the formed raw material comprising iron ore and carbon material is subjected to solid-state reduction and then to carburizing-melting-coalescence. Further, the present invention can lower the S content of such metallic iron by intentionally adding CaO to the formed raw material to adjust the basicity of the slag forming component. After solidification by cooling and then separation from solidified slag, granular metallic iron thus obtained may be used as a raw material to be melted in various ironmaking or steelmaking furnaces.

In the present invention, metallic iron removed from the reduction melting furnace has been cooled to a temperature lower than the melting point thereof but is still in a high temperature state at 800 to 1200° C. Further cooling of the metallic iron to a normal temperature before supply to a steelmaking furnace wastes the thermal energy. It is, therefore, very practical in reducing a heat loss if there is built an ironmaking-steelmaking total production line which is designed to supply such high-temperature metallic iron as it is or as turned into a smelting by further heating to a steelmaking furnace in order to utilize the potential heat of the metallic iron effectively.

Of course, there are known the following techniques: a technique such as to save electric power units of an electric furnace or the like and improve the productivity by feeding high-temperature reduced iron obtained by a known reduced iron producing process to an adjacent steelmaking furnace such as an electric furnace without cooling the same; an ironmaking-steelmaking process (International Publication No. 99/11826) wherein molten iron is prepared by producing high-temperature reduced iron in a reduced iron producing furnace using a coal-based carbon material and immediately feeding such reduced iron to a melting furnace; and like techniques. These known techniques are distinguished from the total production process proposed by the present invention in that they produce what is called "reduced iron" which contains a considerable amount of slag originating from ash contents and gangue components, iron oxide resulting from re-oxidation in the last stage of reduction, and optionally a large quantity of S if the reduced iron is produced using a coal-based reducing agent. By contrast, the total production process according to the present invention produces and uses metallic iron completely separated from slag components by carburizing-melting-coalescence.

Since the desulfurization duty at a refining furnace in the total production process using metallic iron having a lowered content of S is particularly mitigated, it is possible to construct a production system that is very useful and practicable as an ironmaking-steelmaking total production system performing reduction melting of an iron source and melting refinement.

Figure 17:
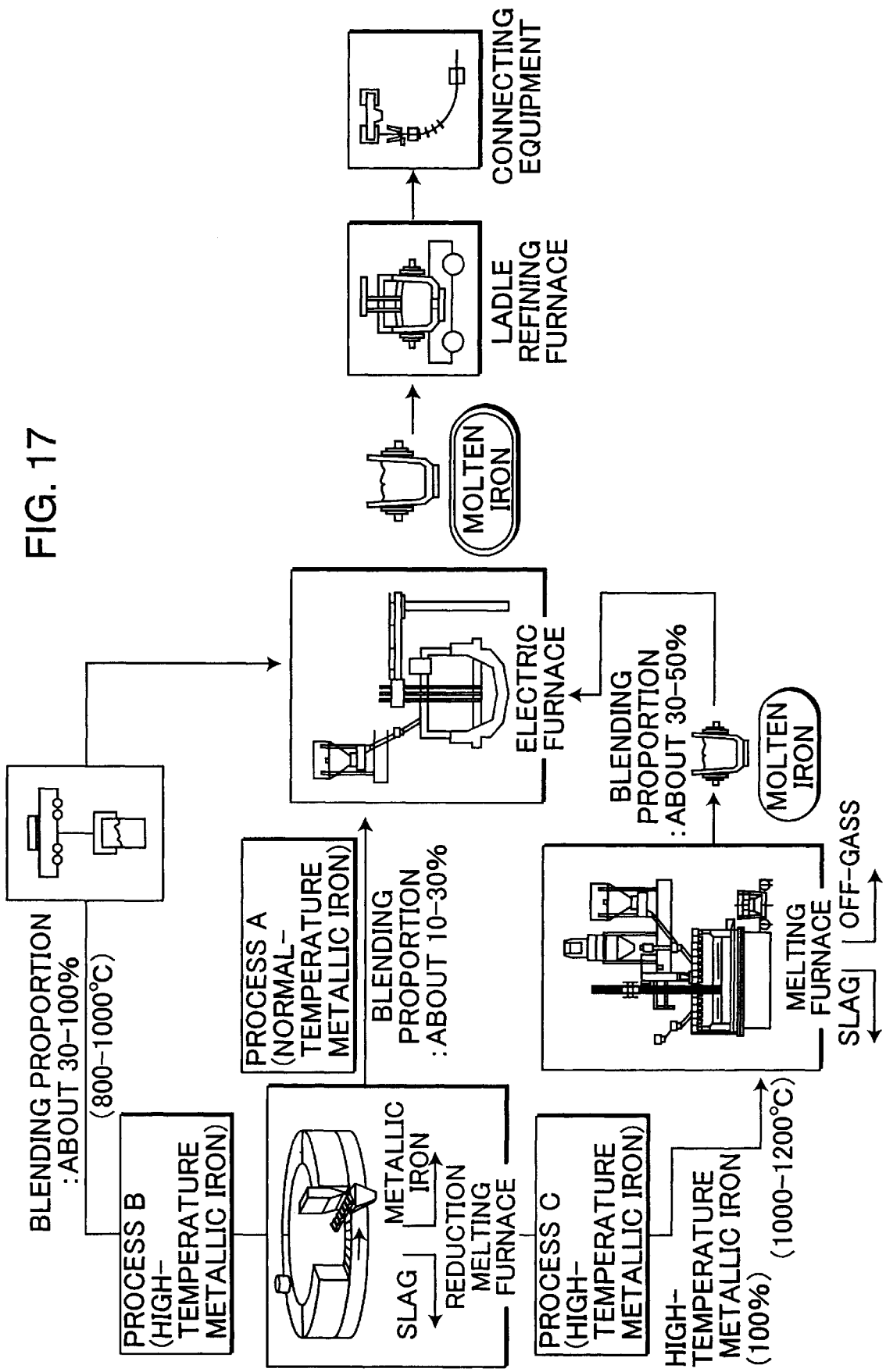
FIG. 17 is an explanatory view illustrating an ironmaking-steelmaking total production system used in the present invention.

FIG. 17 is an explanatory view illustrating an example of such a total production system. In FIG. 17, process A is a steelmaking process in which slag-free metallic iron produced by a reduction melting furnace is cooled to a normal temperature and then fed in an appropriate amount as a steelmaking raw material to a steelmaking furnace such as an electric furnace; process B is adapted to feed metallic iron in a high-temperature state (800 to 1200° C.) to a steelmaking furnace such as an electric furnace located adjacent the reduction melting furnace thereby to reduce electric power units required for supply of heat; and process C is adapted to feed all high-temperature metallic iron produced by the reduction melting furnace to an adjacent melting furnace dedicated to heat-melting of the metallic iron and then feed molten iron to a steelmaking furnace. Since metallic iron obtained according to the present invention is slag-free, has a high purity of iron, and optionally has a low content of S if the metallic iron has been produced with the basicity adjusted to lower the S content, the total production system constructed to use such metallic iron as a steelmaking raw material makes it possible to produce molten steel of a stabilized quality with higher productivity while reducing electric power units of an electric furnace or the like or mitigating the desulfurization duty required.

In the above metallic iron production process where a formed raw material comprising iron oxide as an iron source and a carbonaceous reductant serving to reduce the iron oxide is heated on a moving hearth to cause the iron oxide to be reduced in a solid state, followed by carburizing-melting-coalescence of resulting reduced iron to form granular metallic iron, which is then removed from the furnace after cooling, fluctuations of the operation conditions may cause molten slag to seep and such molten slag is largely responsible for erosion or wear of the hearth refractories. Particularly where unreduced molten FeO is included in such molten slag, such erosion or wear becomes heavier due to penetration and corrosion thereby substantially shortening the life of the hearth refractories.

In view of the foregoing, the present invention provides a technique which minimizes such erosion or wear of the hearth refractories while allowing damaged portions of the hearth refractories to be mended by itself during the operation of the furnace even if such a loss occurs, thereby making it possible to largely prolong the life of the hearth refractories and enhance the continuous operability of the furnace.

The present invention is characterized that metallic iron is produced, while a deposit layer containing slag produced in the above reduction melting process is formed on the hearth refractories to protect the same.

FIG. 18 is a schematic sectional view illustrating one preferred embodiment of the present invention. As shown, a primary protective layer 28 comprising an oxide material composed mainly of alumina (or a mixture of ores having a composition analogous to slag produced as a byproduct in the reduction melting process, or a recycled slag) is previously formed on hearth refractories 27 of a moving hearth type reduction melting furnace in the beginning of the production, and pieces of formed raw material G are successively supplied onto the hearth rotating (see FIG. 18(A)).

As described with reference to FIGS. 1 to 3, the formed raw material is exposed to heat from the burner and radiant heat during its passage through the reduction melting zone $Z_1$, with the result that the iron oxide in the formed raw material is turned into reduced iron by solid-state reduction, and thereafter the reduced iron is further heated to cause carburizing which acts to lower the melting point of the reduced iron, thus resulting in molten iron. The molten iron thus obtained coalesces and grow into granular metallic iron Fe having a relatively large grain size while separating from byproduct slag Sg. The slag Sg also coalesces and, hence, the metallic iron and the slag Sg are separated from each other (see FIG. 18(B).

The granular metallic iron Fe and slag Sg are cooled at a location immediately upstream of the foregoing discharge means and then moved to the location of the discharger means, which in turn rakes out the granular metallic iron Fe and slag Sg in a solidified state from the surface of the hearth. This process is not shown.

Molten slag produced as a byproduct during the reduction melting process is unified with the primary protective layer 28 to form a slag deposit layer T. Since the melting-solidification process produces fine granular metallic iron $Fe_S$ (hereinafter referred to as "particulate iron" as the case may be) which has not yet coalesced and grown sufficiently and high-melting-point slag $Sg_S$ in considerable amounts, such particulate iron $Fe_S$ and slag $Sg_S$ pass through the space between the discharger 6 and the surface of the slag deposit layer T and remain on the surface of the slag deposit layer T or are partially caught therebetween and hence forcibly buried into the deposit layer T (see FIG. 18 (C)).

If the continuous production is performed in this state, particulate iron $Fe_S$ and the like remaining on or buried into the surface of the slag deposit layer T are gradually deposited and enlarged and hence may become incapable of being ejected.

Figure 18A:
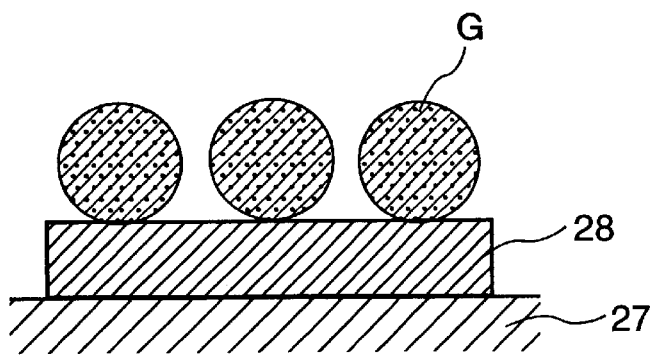
FIG. 18 is a conceptual view illustrating the state of a slag deposit layer formed when the present invention is adopted.
Figure 18B:
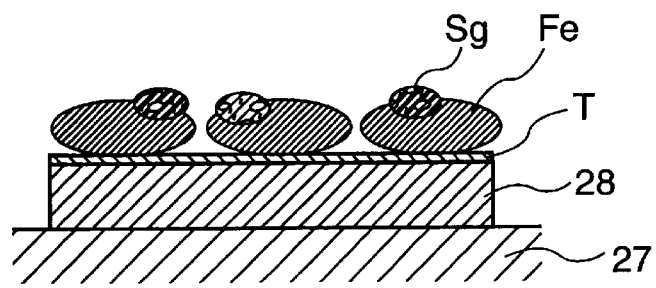
Figure 18C:
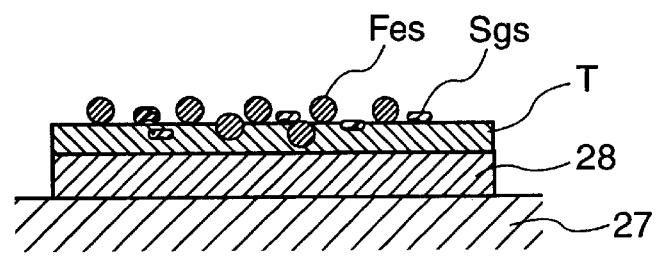
Figure 18D:
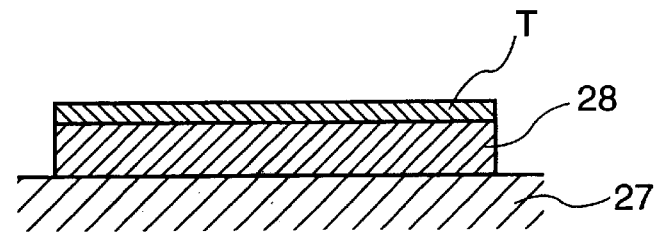
Figure 18E:
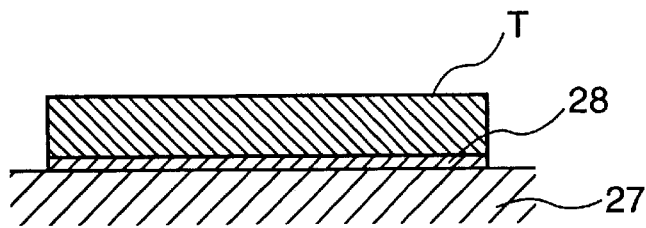

According to the present invention, such an inconvenience due to deposition of particulate iron $Fe_S$ and the like is avoided by scraping particulate iron $Fe_S$ and the like together with a part or whole of the deposit layer T at the time when the amount of particulate iron $Fe_S$ and the like deposited on and buried into the deposit layer T reaches to a certain level. Thus, the surface of the deposit layer T on the hearth is smoothed as shown in FIG. 18(D), resulting in a smooth protective layer comprising the primary protective layer 28 formed in the beginning of the production and thin deposit layer T covering the same.

When the production is further continued in this state and slag deposit layer T grows to a certain level again due to deposition and adherence, the deposit layer T (or the deposit layer T and part of the protective layer 28) is removed intermittently or continuously together with particulate iron $Fe_s$ and the like. By repeatedly performing such an operation with appropriate intervals the first-formed primary protective layer 28 is gradually renewed on the upper side thereof with slag deposit layer T, and finally the primary protective layer 28 is mostly replaced with slag deposit layer T, resulting in a state shown in FIG. 18 (E). Thus, the surface of the hearth becomes stabilized in this state. In this case, part of the primary protective layer 28 remains on the surfaces of the hearth refractories 27 over a considerable length of period from the starting of the production or a small portion of the primary protective layer 28 may remain on the surfaces of the hearth refractories 27 all the time under a certain condition under which slag deposit layer T is raked out.

When the production is further continued in this state, only the surface side of the deposit layer T is renewed continuously with slag produced as a byproduct in the reduction melting process and, as a result, the surface of the hearth is constantly maintained smooth without any damage to the hearth refractories 27.

The thickness of the slag deposit layer T can be controlled simply by vertically shifting deposit layer removing means (which may serve also as the discharger 6 or may be provided separately from the same) to adjust the spacing between the removing means and the surface of the hearth. More specifically, in the initial period of the production, control is performed so that the deposit layer T becomes gradually thicker by gradually shifting the blade position of the removing means upward to widen the spacing between the blade and the surface of the deposit layer T, and at the time the amount of particulate iron $Fe_s$ and the like adhering and deposited on and in the deposit layer T has increased to a certain level a thickness of the deposit layer T to be removed or left is adjusted as desired by shifting the blade of the removing means down to a position corresponding to a depth of the deposit layer T to be removed. By intermittently or continuously repeating such upward and downward shifting of the blade with appropriate intervals it is possible to constantly maintain the surface of the deposit layer smooth while preventing excessive deposition of particulate iron $Fe_s$ on and in the deposit layer T.

FIG. 19 schematically illustrates such operations. Specifically, FIG. 19 (A) illustrates the operation of allowing the deposit layer T to thicken by gradually shifting the blade position of the discharger 6 upwardly, while FIG. 19 (B) illustrates the operation of removing part of the deposit layer T together with particulate iron $Fe_s$ by shifting the blade position of the discharger 6 down to a position corresponding to a depth of the deposit layer T to be removed at the time the deposited amount of particulate iron $Fe_s$ and the like remaining on and buried in the deposit layer T has increased to a certain level.

Although the above description is directed to the case where the deposit layer T is allowed to gradually thicken by gradually shifting the blade position of the discharger 6 upwardly and at the time the adhering or deposited amount of particulate iron $Fe_s$ has increased to a certain level a surface portion of the deposit layer T is removed to a desired depth by shifting the blade position of the discharger 6 down to a position corresponding to a depth of the deposit layer T to be removed at a stretch, another procedure is possible such that: the level of the deposit layer at which the furnace is operated is predetermined in the beginning of the production; the raking blade of the discharger 6 is set to a position corresponding to the predetermined level of the deposit layer to allow the primary protective layer 28 to deposit to that level; and at the time when penetration and corrosion of the primary protective layer 28 and deposition of particulate iron has proceeded to a certain degree, the raking blade is lowered at a stretch to remove a surface portion of the deposit layer T.

As described above, the slag deposit layer removing means may serve also as the discharge means of produced metallic iron Fe or may be provided separately. There is no particular limitation to the specific mechanism and construction of the removing means, and any type of removing means, for example, a screw type or a scraper type, may be employed so long as the removing means has a function to efficiently removing part or whole of the deposit layer T while making the protective layer smooth. Further, there is no particular limitation to specific means for vertically shifting the blade position of the removing means, and any known vertically shifting means may be selected for use as desired.

According to the present invention, the surfaces of the hearth refractories are constantly protected by the primary protective layer 28 formed in the beginning of the production and the deposit layer T formed by deposition of slag produced as a byproduct during the subsequent processes in the production, and particulate iron adhering to or deposited on the surface of the hearth is ejected from the surface of the hearth in removing a surface portion of the deposit layer T periodically or continuously. Thus, a trouble or inconvenience due to excessive deposition of particulate iron does not occur.

Figure 20A:
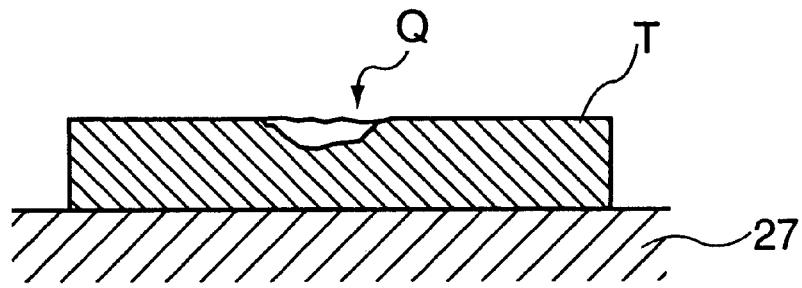
FIG. 20 is a conceptual view illustrating how the hearth is mended according to yet another example of the invention.
Figure 20B:
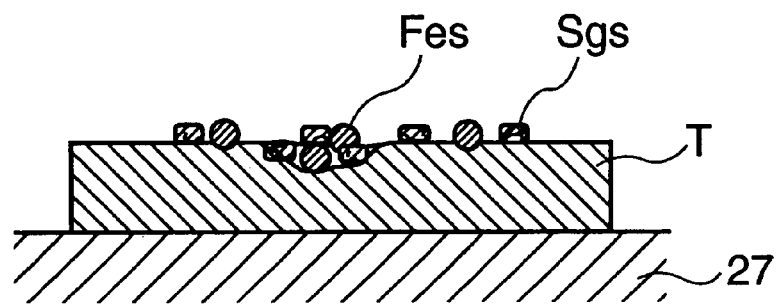
Figure 20C:
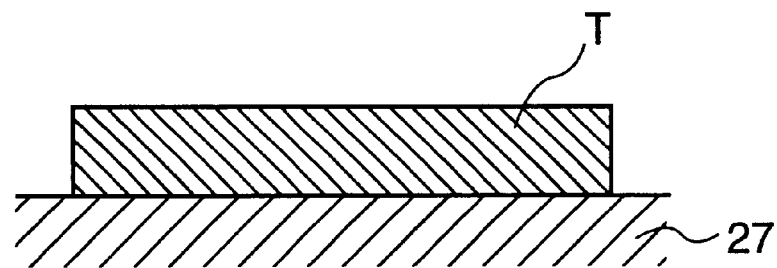
Figure 21A:
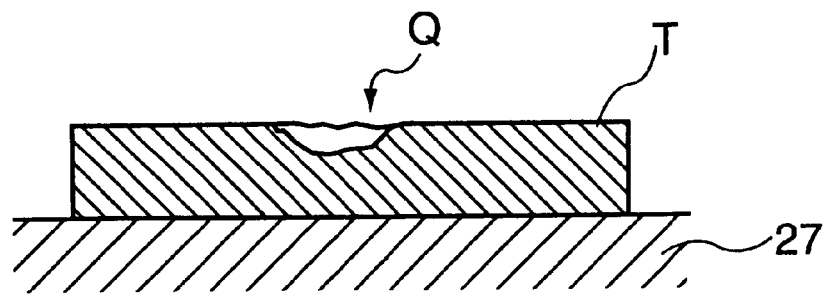
FIG. 21 is a conceptual view illustrating how the hearth is mended according to still another example of the invention.
Figure 21B:
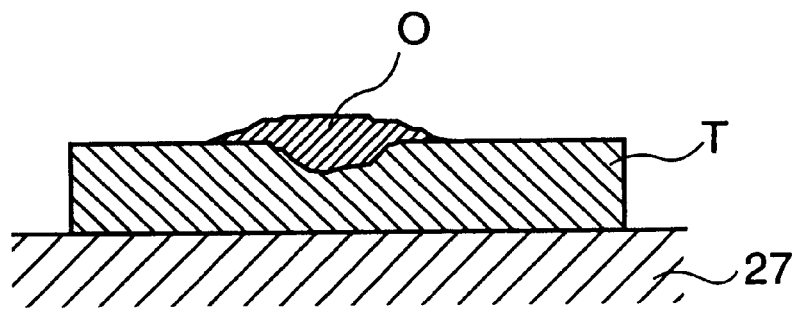
Figure 21C:
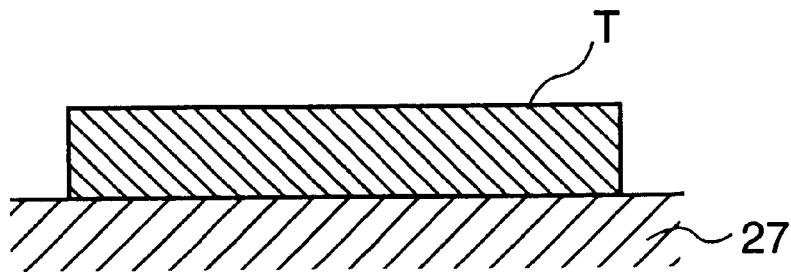
Figure 22A:
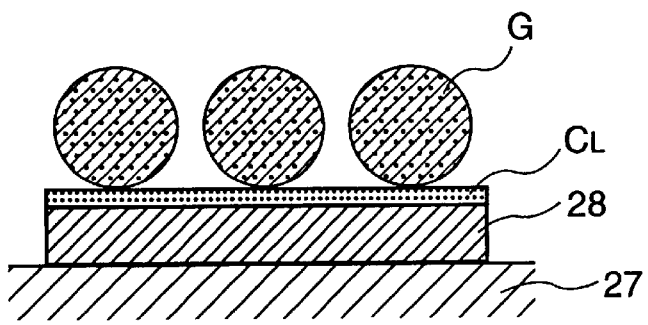
FIG. 22 is a conceptual view illustrating a situation of hearth mending when an overlayer of an atmosphere adjusting agent is formed.
Figure 22B:
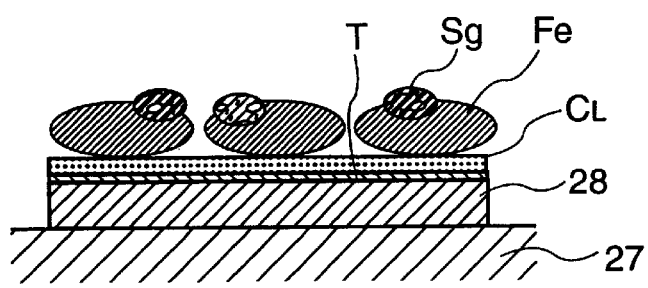
Figure 22C:
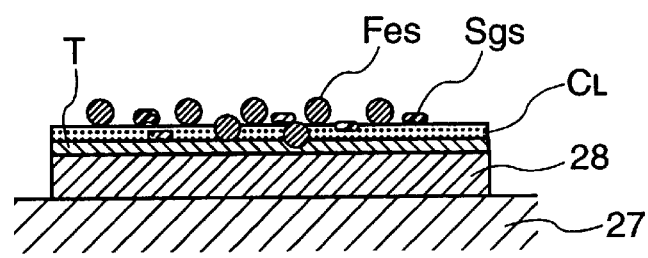
Figure 22D:
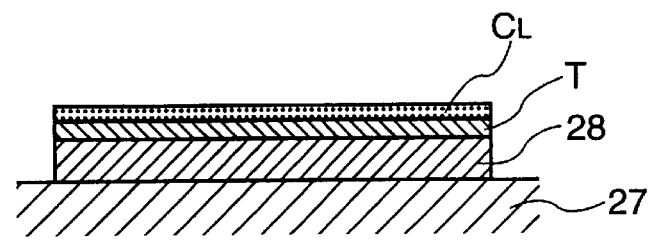
Figure 22E:
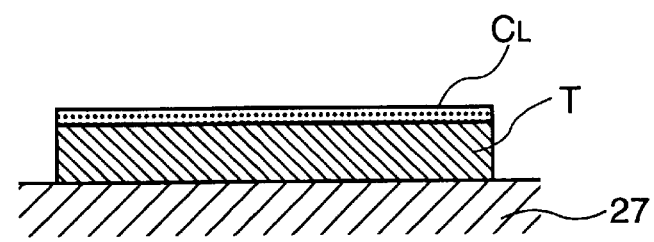

Even though the surface of the slag deposit layer T is somewhat damaged, such a damaged portion are mended by itself by virtue of deposition of slag produced as a byproduct during the operation of the furnace and, hence, the surface of the hearth can be maintained smooth semipermanently unless an unexpected accident occurs. FIG. 20 is a schematic sectional view illustrating a self-mending process in the case where the surface of slag deposit layer T is dented. When a dent Q is formed in the surface of the deposit layer T (see FIG. 20(A)), byproduct slag Sg together with particulate iron $Fe_s$ and the like produced in the reduction melting process of the next production cycle deposits in the dent Q (see FIG. 20(B)) and a surface portion of the deposit layer T containing the slag Sg and particulate iron $Fe_S$ thus deposited is removed on the downstream side whereby the surface of the hearth is smoothed (see FIG. 20(C)). Alternatively, an ore mixture O (or recycled slag) of which the composition is adjusted so as to be as substantially same as the composition of byproduct slag may be put in the dent Q to achieve similar mending, as shown in FIGS. 21(A) to 21(C).

For the hearth surface to be constantly maintained smooth by the self-mending function of such byproduct slag, it is desirable that control be exercised to maintain the thickness of the slag deposit layer T within a proper range, preferably within the range of several millimeters to dozens of millimeters.

As the material forming the primary protective layer 28, an oxide material composed mainly of alumina which has a superior resistance to erosion or wear caused by typical molten slag is most preferable. However, since the method of the present invention utilizes deposition of slag produced as a byproduct during the production, it is possible to use a mineral substance having a composition analogous to such byproduct slag or recycled slag. Since the deposit layer T is gradually formed on the surfaces of the hearth refractories from the initial stage of the production, a sufficient hearth refractories protective effect can be obtained by forming primary protective layer 28 in a minimum amount required to protect the hearth refractories at first and allowing byproduct slag to deposit thereon with time. Though the primary protective layer 28 formed in the beginning of the production is likely to be replaced with deposit layer T of byproduct slag substantially entirely in a long-term continuous production in particular, a sufficient hearth refractories protective effect is still exhibited.

There is no particular limitation to the size of the material forming the primary protective layer. However, the material preferably has a smaller size, desirably in a powder form because larger-size solid constituents of the material define clearances which are likely to permit any molten matter to flow down to and contact the hearth refractories. Accordingly, preferable size of the material is 4 mm or less, more preferably 2 mm or less.

The material forming the primary protective layer is preferably charged onto the hearth using the feed device for supplying auxiliary raw materials according to the present invention because the use of the feed device makes it possible to form a primary protective layer that has an even thickness in the widthwise direction of the hearth and is continuous in the moving direction of the hearth.

In the case where the melting point of a surface portion of the slag deposit layer T to be gradually replaced with molten or semi-molten slag produced as a byproduct in the reduction melting process as described above is too low, resulting granular metallic iron having a high specific gravity sinks into the deposit layer T and hence becomes difficult to eject. For this reason, the hardness of the deposit layer T is desirably maintained to such a degree as not to allow such granular metallic iron to sink into the deposit layer T. To this end, the composition of slag forming component to be incorporated in the formed raw material can be adjusted in the preparation of the formed raw material so that slag having a desired melting point will be produced as a byproduct. However, when the melting point of byproduct slag is too high, metallic iron resulting from solid-state reduction becomes difficult to separate from byproduct slag in the smelting separation stage. This is largely responsible for a decrease in the purity of metallic iron as a product.

In pursuit of a solution of this problem, study has been made to restrain metallic iron from sinking into the deposit layer as much as possible by raising the melting point of the slag deposit layer T to be renewed, with the melting point of byproduct slag kept relatively low. As a result, it has been discovered that addition of a melting point adjusting additive serving to raise the melting point of the deposit to the surface portion of the slag deposit layer T is effective. Specifically, when such a melting point adjusting additive is added to the surface portion of the deposit layer T intermittently or continuously at a desired location, the melting point of the deposit layer T is raised even if byproduct slag has a low melting point and, hence, the deposit layer T becomes harder, thereby preventing granular metallic iron from sinking into the deposit layer as much as possible.

Though the kind of the melting point adjusting additive to be used differs depending upon the composition of byproduct slag, examples of preferred melting point adjusting additives include an oxide material comprising alumina and an oxide material comprising magnesia. Such preferred additives may be used either alone or in combination of two or more of them.

Such a melting point adjusting additive may be used in an appropriate amount depending upon the composition of byproduct slag at any location without limitation. Usually, the melting point adjusting additive is periodically or continuously charged onto the slag deposit layer T at a location adjacent the formed raw material charging point or at a suitable location in the reduction melting zone. Though the manner of charging the additive is not limited either, use of the feed device for supplying auxiliary raw materials according to the present invention is desirable.

Also effective in obtaining the same result as above is a cooling method such as to cool the slag deposit layer T from the lower side of the hearth by means of a cooling jacket or spraying of cooling gas to cause the deposit layer T to solidify to such a hardness as to prevent metallic iron from sinking into the deposit layer T. Such cooling from the lower side of the hearth is employed to facilitate solidification of the deposit layer T because hindrance to heating reduction of iron oxide caused by cooling can be depressed by such a cooling method. Since iron oxide is heated and reduced by heat generated by combustion caused by a burner mounted on a wall surface of the reduction melting furnace and radiant heat from above the hearth as described earlier, there is no fear that the reduction-melting efficiency is substantially affected even if the slag deposit layer T on the surface of the hearth is forcibly cooled from the lower side of the hearth in the reduction process.

As described above, removal of an excess of the slag deposit layer T is achieved by the discharge means serving also as a discharger of granular metallic iron obtained as a product or by the removing means dedicated to removal of such an excess of the slag deposit layer. In minimizing the load imposed on such discharge means or removing means and making the surface resulting from the removal as smooth as possible, it is desirable that the temperature be controlled so that the slag deposit layer assumes a solid-liquid coexistent state like sherbet at the time of removal by raking out. Means for realizing such a temperature control is, for example, cooling from the lower side of the hearth by means of a cooling jacket or spraying of cooling gas.

Since slag deposit raked out from the slag deposit layer contains a considerable amount of particulate iron as well as the slag component and such particulate iron has a high purity of iron, such particulate iron is preferably collected together with product metallic iron by separating particulate iron from the raked-out slag deposit with use of any desired means such as a magnetic separater.

In still another mode of the present invention it is effective that the atmosphere adjusting agent is thinly spread over the protective layer 28 or the slag deposit layer T before the formed raw material is charged. In facilitating solid-state reduction by heating while preventing reduced iron from being re-oxidized by oxidizing gases (including $CO_2$ and $H_2O$) resulting from combustion for heating, raising the reducing potential of the atmosphere in the furnace, particularly of the atmosphere present in proximity to the formed raw material is effective. By spreading the atmosphere adjusting agent over the hearth surface as above the reducing potential of the atmosphere in the furnace is kept high thereby facilitating reduction-melting efficiently with re-oxidation of reduced iron prevented. Further, the atmosphere adjusting agent also acts to inhibit adherence of metallic iron to the slag deposit layer T and hence eases release of granular metallic iron from the hearth surface thereby making the ejection thereof smooth.

FIGS. 22(A) to 22(E) are schematic sectional views illustrating how reduction-melting proceeds and how self-mending of the hearth is achieved in the case where the atmosphere adjusting agent is spread over the hearth. This case is not substantially different from the case shown in FIGS. 18 (A) to 18(E) except atmosphere adjusting agent layer $C_L$ is formed on the slag deposit layer T and the formed raw material G is placed thereon.

Figure 23A:
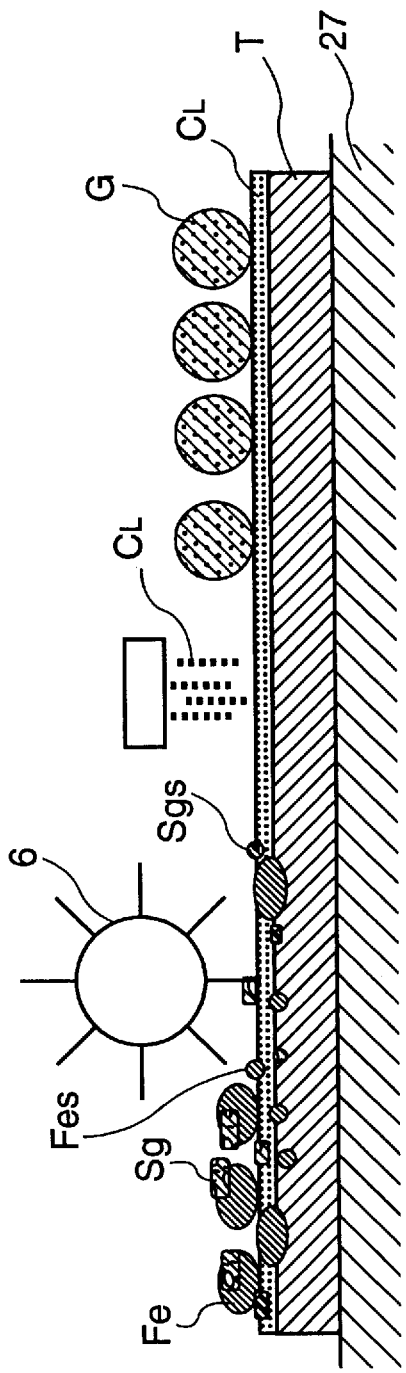
FIG. 23 is a conceptual view illustrating another situation of hearth mending when an overlayer of an atmosphere adjusting agent is formed.
Figure 23B:
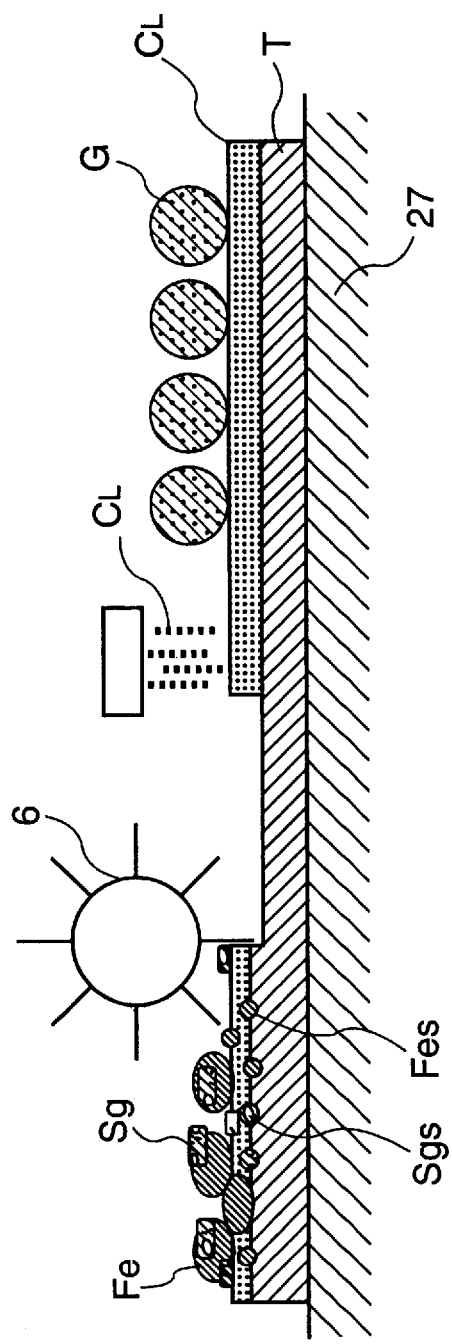

FIGS. 23 (A) and 23 (B) are schematic sectional views illustrating how the hearth is mended in the case where the atmosphere adjusting agent $C_L$ is spread over the hearth. This process proceeds as follows. The atmosphere adjusting agent $C_L$ is first spread over the slag deposit layer T and then the formed raw material G is charged onto the layer of the atmosphere adjusting agent, followed by reduction melting of the formed raw material (see FIG. 23 (A)). When the deposited amount of particulate iron $Fe_s$ and the like in and on the slag deposit layer T and the atmosphere adjusting agent layer $C_L$ increases to a certain extent, the blade is lowered as shown in FIG. 23 (B) to remove the surface portion of the slag deposit layer T bearing accumulated particulate iron $Fe_s$ together with the atmosphere adjusting agent $C_L$ thereby smoothing the slag deposit layer T horizontally. Subsequently, atmosphere adjusting agent $C_L$ is charged again to a predetermined thickness from the auxiliary raw material feed device 9 before the hearth reaches to the supply position of raw material by its rotation, and then formed raw material G is charged again. In this way the continuous production can be realized. In charging or supplying the atmosphere adjusting agent use of the above feed device is recommended.

Although there is no particular limitation to the thickness of the atmosphere adjusting agent layer $C_L$ to be spread, a very small thickness will suffice in effectively raising the reducing potential of the atmosphere present in proximity to the formed raw material or easing release of granular metallic iron from the hearth surface. Usually, the atmosphere adjusting agent layer $C_L$ having a thickness of about 1 to 10 mm or lower serves the purpose. As a practically simple and effective method, it is recommended that an appropriate amount of the foregoing melting point adjusting additive be blended with the atmosphere adjusting agent $C_L$ to obtain the effect of raising the melting point of the slag deposit layer T in combination with the foregoing effects of the atmosphere adjusting agent $C_L$.

EXAMPLES

Hereinafter, the present invention will be specifically described as to its constitution and advantages by way of examples. It is needless to say that the present invention is not limited to the following examples and may be practiced by changing or modifying these examples so long as such changes and modifications meet the context of this specification. Of course, such changes or modifications are within the technical scope of the present invention.

Example 1

A formed raw material having a diameter of about 19 mm was prepared by homogeneously mixing hematite iron ore as an iron source, coal and a small amount of a binder (bentonite) and this formed raw material was used to produce metallic iron. Specifically, the formed raw material was charged into a rotary hearth type reduction melting furnace as shown in FIGS. 1 to 3 and the temperature of the atmosphere in the furnace was adjusted to about 1350° C. to allow solid-state reduction to proceed until the metallization rate reached about 90%. Subsequent to this solid-state reduction, the formed raw material was transferred to a carburizing-melting-coalescence zone in which the atmospheric temperature was set to 1440° C. to cause carburizing-melting-coalescence of iron and separation of byproduct slag, thus giving slag-free metallic iron.

Figure 24:
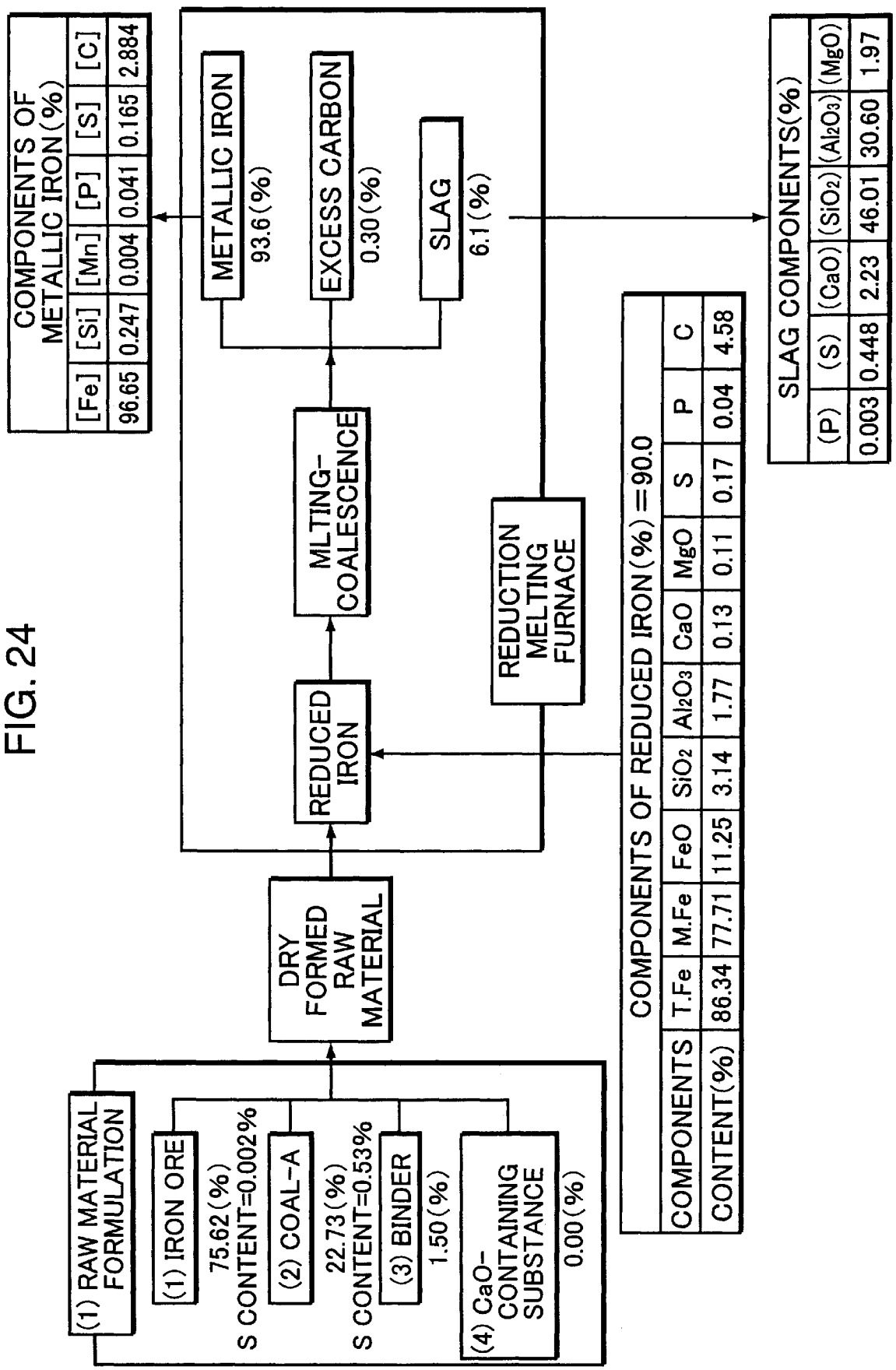
FIG. 24 is an explanatory diagram showing the formulation of a raw material, ratio and compositions of products and the like in a metallic iron production process employed in an example.

In this case a layer of granular coal having a particle diameter of 2 mm or less serving as an atmosphere adjusting agent was previously formed to a thickness of about 5 mm over the hearth before the formed material was charged so that the reducing degree of the atmospheric gas in the carburizing-melting-coalescence stage assumed a value within the range between 0.60 and 0.75. FIG. 24 shows the formulation of the raw material, composition of reduced iron upon completion of the solid-state reduction, composition of the finally-obtained metallic iron, composition of resulting slag, and the like in this production process.

Figure 25:
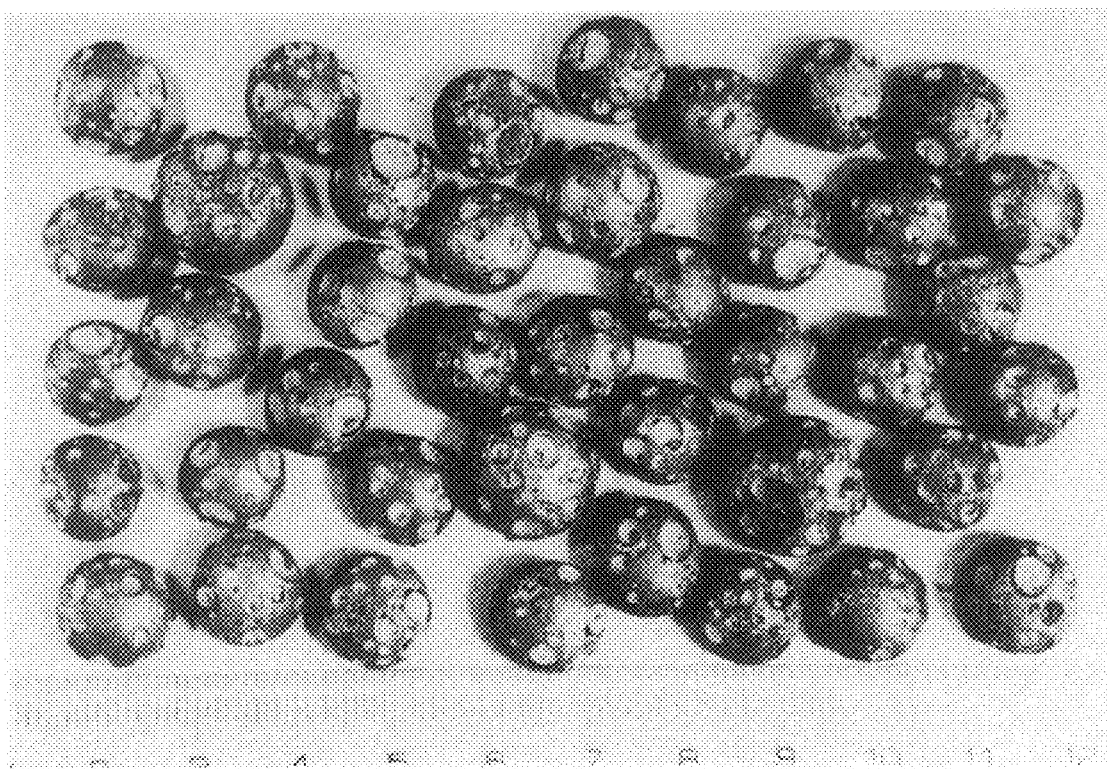
FIG. 25 is a photograph showing exemplary metallic iron obtained in an example of the invention.

The metallic iron substantially completely separated from slag by melting-coalescence was transferred to a cooling zone and cooled to 100° C. for solidification therein, followed by ejection of the metallic iron thus solidified by a discharge means. The metallic iron thus obtained, byproduct slag and excess carbon material were analyzed as to their production ratio and respective compositions. Incidentally, according to analysis of the composition of reduced iron sampled from the reduction melting furnace just before the carburizing-melting stage, the metallization rate was about 90% and the amount of residual carbon was 4.58%. The time period from the charging of the formed raw material into the furnace to the removal of metallic iron from the furnace was about 9 mm, which is very short, and the resulting metallic iron contained C in an amount of 2.88%, Si in an amount of 0.25% and S in an amount of 0.17%. Thus, it was possible to separate metallic iron from byproduct slag. The appearance of metallic iron finally obtained is shown in FIG. 25 (photograph).

Example 2

A formed raw material having a diameter of about 19 mm was prepared by homogeneously mixing magnetite iron ore as an iron source, coal, a small amount of a binder (bentonite), and $CaCO_3$ in an amount of 5% for slag basicity adjustment and granulating the mixture.

Figure 26:
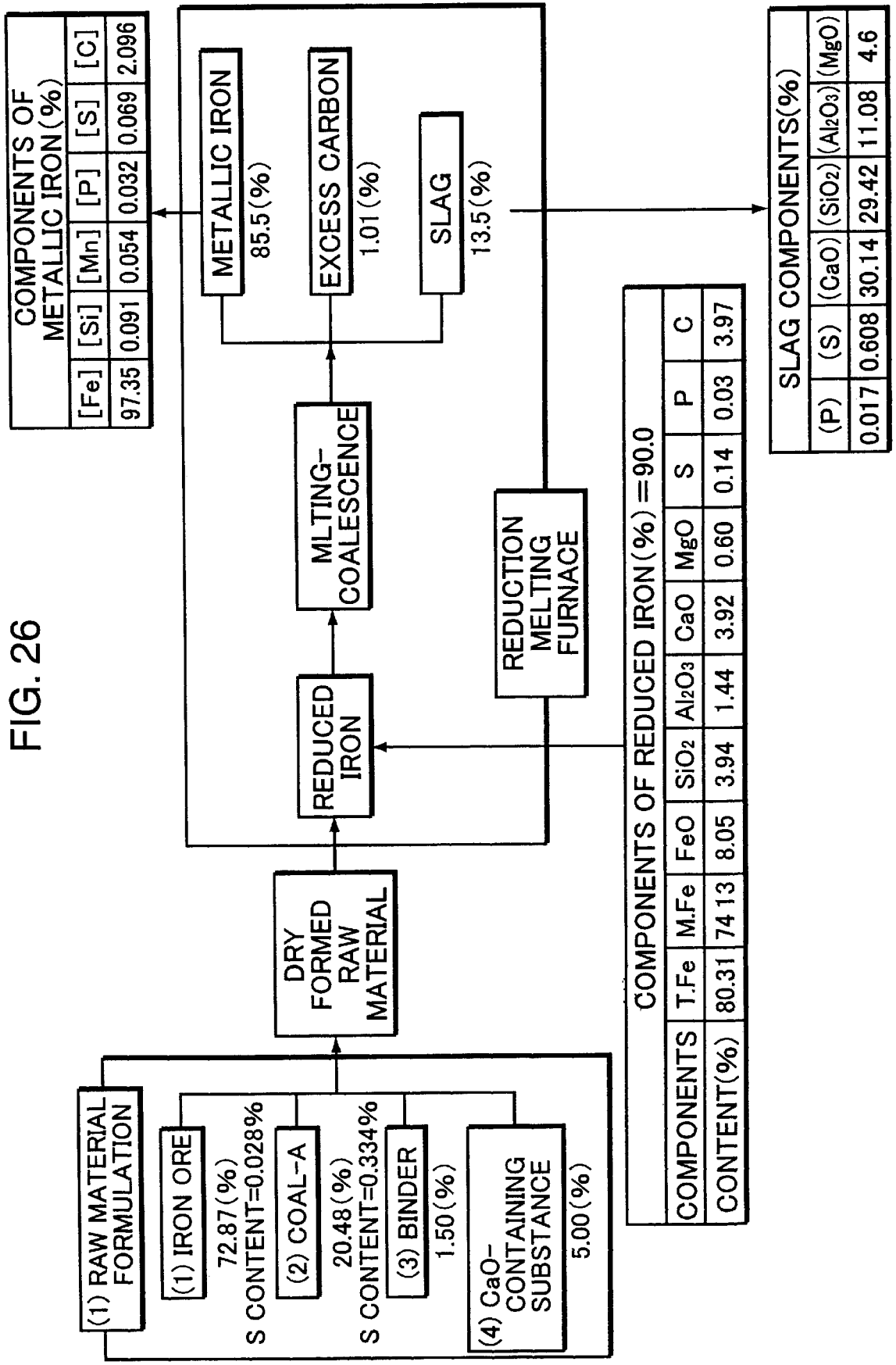
FIG. 26 is an explanatory diagram showing the formulation of a raw material, ratio and compositions of products and the like in a metallic iron production process employed in another example.

The formed raw material was charged onto the hearth over which a layer of granular coal (mean particle diameter: about 3 mm) as an atmosphere adjusting agent had been spread, and the temperature of the atmosphere in the furnace was maintained to about 1350° C. as in Example 1 to allow solid-state reduction to proceed until the metallization rate reached about 100%. Subsequent to this solid-state reduction, the formed raw material was transferred to the melting zone in which the atmospheric temperature was set to 1425° C. to cause carburizing-melting-coalescence of iron and separation of byproduct slag, thus giving slag-free metallic iron. FIG. 26 shows the formulation of the raw material, composition of reduced iron upon completion of the solid-state reduction, composition of the finally-obtained metallic iron, composition of resulting slag, and the like in this production process.

The metallic iron substantially completely separated from slag by melting and coalescence was transferred to the cooling zone and cooled to 100° C. for solidification therein, followed by ejection of the metallic iron thus solidified by a discharge means. The metallic iron thus obtained, byproduct slag and excess carbon material were analyzed as to their production ratio and respective compositions. Incidentally, according to analysis of the composition of reduced iron sampled from the reduction melting furnace just before the carburizing-melting stage, the metallization rate was about 92.3% and the amount of residual carbon was 3.97%. The time period from the charging of the formed raw material into the furnace to the removal of metallic iron from the furnace was about 8 mm, which is very short, and the resulting metallic iron contained C in an amount of 2.10%, Si in an amount of 0.09% and S in an amount of 0.065%. Since the CaO source was added to the formed raw material to lower the S content of the resulting metallic iron in this experiment, enhanced S-content lowering effect resulted as compared with Example 1.

Though there was a fear of seeping of molten slag in the latter half of the solid-state reduction stage because the melting point of byproduct slag was lowered by the addition of the CaO source, any problematic erosion or wear of the hearth refractories due to seeping of molten slag did not occur since the two-step heating system was adopted in which the temperature in the solid-state reduction stage was set within 1200 to 1400° C. to provide reduced iron having a higher metallization rate in the solid-state reduction stage and then the temperature was raised to a value within 1350 to 1500° C., and since the layer of coal powder serving as the atmosphere adjusting agent was spread over the hearth surface.

According to detailed microscopic observations of reduced iron sampled in the last stage of solid-state reduction, it was confirmed that high concentration Fe—(Mn)—S was present on the surface of reduced iron sampled from Example 1 where any CaO source was not added and this Fe—(Mn)—S was then incorporated into molten iron in the carburizing-melting stage, whereas in Example 2 where the CaO source was added, most part of S reacted with and fixated by the CaO source in the last stage of solid-state reduction thereby inhibiting incorporation of S into molten iron in the carburizing-melting stage.

An additional experiment was conducted as in the above experiment except that finer coal powder having a particle size of 2.0 mm or less was used as the atmosphere adjusting agent. Metallic iron obtained in this experiment was confirmed to contain S in an amount lowered to 0.032%.

Example 3

Using a formed raw material having a particle size of 19 to 20 mm and admixed with limestone in an amount of 5%, solid-state reduction and carburizing-melting-coalescence were performed in the same manner as in Example 2 to produce granular metallic iron. This metallic iron was cooled to 800° C. and removed from the furnace. In turn, the metallic iron maintained at the same temperature was charged into an electric furnace together with scrap iron as an iron source and melted therein. The proportion of the metallic iron in the total amount of iron sources used was about 40%, the balance being the scrap iron.

As a result, it was confirmed that the electric power consumption of the electric furnace was reduced by about 68 kWh/t (15%) as compared with the case where the electric furnace consumed 448 kWh/t in melting the raw material consisting of scrap iron only and that the productivity was about 14% improved by virtue of a shortened melting time. It was further confirmed that the metallic iron contained S in an amount lowered to 0.018%, which was substantially equal to the S content of intended molten steel and, hence, the desulfurization duty imposed on the electric furnace could be largely mitigated and a stabilized and efficient production could be ensured. Furthermore, since the metallic iron was substantially free of slag, use of the metallic iron allowed production of molten steel of a higher quality with less impurity inclusions.

Comparative Example 1

An experiment was conducted to produce granular metallic iron in the same manner as in Example 1 except that atmosphere adjustment was performed so that the reducing degree of the atmospheric gas in the carburizing-melting zone allowing carburizing and melting of particulate reduced iron substantially finished with solid-state reduction assumed a value within the range of 0.35 to 0.45. The metallic iron resulting from this experiment was of an inferior commercial value because it was in a shell-like shape partially having slag entangled therein as shown in FIG. 27 and had a Fe purity as low as about 90% or lower and a low C content (about 0.7% or lower).

As apparent from these results, when the reducing degree of the atmosphere in the carburizing-melting-coalescence stage is less than 0.5, granular metallic iron having a high Fe purity cannot be obtained because: residual carbon becomes exhausted by the atmospheric gas; fine and active reduced iron is susceptible to re-oxidation; melting of reduced iron is difficult at 1500° C. or lower due to insufficient carburizing; and separation of byproduct slag does not proceed efficiently.

Example 4

An atmosphere adjusting agent (powder containing a carbonaceous material) was supplied onto a hearth 1 of a moving hearth type furnace using a feed device 10 as shown in FIG. 9 to form an atmosphere adjusting agent layer. Subsequently, a powdery raw material of reduced iron prepared by mixing at least a carbonaceous reductant and an iron oxide containing substance was supplied onto the auxiliary raw material (atmosphere adjusting agent layer) so as not to come into direct contact with the hearth 1. The powdery raw material was then subjected to solid-state reduction at an elevated temperature, and metallic iron resulting from the solid-state reduction was melted by subsequent heating to cause separation of at least those slag components contained in the raw material and coalescence of molten metallic iron into granular iron.

With the reduced iron production method according to Example 4 of the present invention, a thin and continuous layer of an atmosphere adjusting agent can be formed to an even thickness on the hearth 1 by means of the raw material feed device 10 and, hence, homogenized granular iron of improved quality can be obtained in a higher yield with less cost. Further, such a thin and continuous layer of atmosphere adjusting agent formed to an even thickness on the hearth 1 enables a higher metallization rate to be reached while protecting the hearth 1. Further, since it is possible to supply the atmosphere adjusting agent in a minimum amount required, wasteful use of the carbonaceous material containing powder can be avoided, while at the same time reduced iron can be prevented from becoming heterogeneous due to differences on the hearth 1.

In the case where the moving hearth type furnace 11 is of the rotary type, there is a difference in moving speed between the inner circumference side and the outer circumference side of the hearth which may cause the atmospheric gas in the furnace to flow differently at different speeds. However, the process according to this example brings an excellent effect of avoiding variations in the reduced state of iron in the formed raw material due to such differences.

In Example 4, the atmosphere adjusting agent layer was formed on the hearth 1 by supplying the atmosphere adjusting agent thereto with use of the powdery raw material of the reduced iron feed device 10 according to embodiment 1 and then a layer of formed raw material was formed on the hearth 1 by supplying the powdery raw material. The raw feed device 10 may be replaced with a raw material feed device having a supply duct not partitioned with a partition panel or any one of the raw material feed devices according to any present inventive embodiments. Even if a mixed powder comprising a powdery raw material of reduced iron prepared by mixing at least an iron oxide containing powder and a carbonaceous material containing powder, and a carbonaceous material containing powder is supplied, a certain effect can be expected to result.

Of course, the raw material to be supplied may be, at least, in a small agglomerate form or in a small-size pellet form as well as in a powder form.

Example 5

In the reduced iron production method according to this example, the feed device 10 shown in FIG. 9 was used. First, a carbonaceous material containing powder was spread over the hearth 1 of the moving hearth type furnace 11 to form a layer of the carbonaceous material containing powder on the hearth 1.

Subsequently, a powdery raw material of reduced iron prepared by mixing at least a carbonaceous reductant and an iron oxide containing substance was supplied to form a layer thereof on the hearth 1 so as not to come into direct contact with the hearth 1. The powdery raw material of reduced iron was then subjected to solid-state reduction at an elevated temperature, and metallic iron resulting from the solid-state reduction was melted by subsequent heating to cause separation of at least those slag components contained in the powdery raw material, followed by ejection of molten iron having separated from the slag components through a molten iron ejecting port.

The molten iron ejecting port provided on the hearth 1 of the moving hearth type furnace comprises, for example, a recess for collecting and storing molten iron, a molten iron ejecting hole located in a lower portion of the recess, and a slide valve located under the molten iron ejecting hole.

The scope of the present invention also includes the case where a carbonaceous material containing powder is supplied onto the hearth 1 by means of the raw material feed device 10 to form a layer of the carbonaceous material containing powder on the hearth 2, and medium- or large-size pellets formed from a raw material of reduced iron comprising a mixed powder obtained by mixing an iron oxide containing powder and a carbonaceous material containing powder are supplied onto the carbonaceous material containing powder layer by means of another feed device.

As can be clearly understood from the foregoing, Example 5 is similar to Example 4 except that Example 4 is directed to the production of granular iron whereas Example 5 is directed to the production of molten iron and, hence, Example 5 can provide advantages similar to those of Example 4. As in Example 4, the raw material feed device 10 may be replaced with a raw material feed device having a supply duct not partitioned with a partition panel or any one of the raw material feed devices according to the embodiments shown in FIGS. 10 to 12. Even if a mixed powder comprising a powdery raw material of reduced iron prepared by mixing at least an iron oxide containing powder and a carbonaceous material containing powder, and a carbonaceous material containing powder is supplied, a certain effect can be expected to result. Similarly, even if only the powdery raw material of reduced iron prepared by mixing at least an iron oxide containing powder and a carbonaceous material containing powder is supplied, a certain effect can be expected to result.

Of course, the raw material to be supplied may be in a small-size pellet form.

Example 6

An atmosphere adjusting agent (powder containing a carbonaceous material) was supplied onto a hearth 1 of a moving hearth type furnace using a feed device 10 as shown in FIG. 9 to form an atmosphere adjusting agent layer. Subsequently, a formed raw material (pellet) prepared by mixing at least a carbonaceous reductant and an iron oxide containing substance was supplied onto the auxiliary raw material (atmosphere adjusting agent layer) using another feed device as shown in FIG. 9 (not shown) so as not to come into direct contact with the hearth 1. The formed raw material was then subjected to solid-state reduction at an elevated temperature, and metallic iron resulting from the solid-state reduction was melted by subsequent heating to cause separation of at least those slag components contained in the raw material and coalescence of molten metallic iron into granular iron.

With the reduced iron production method according to Example 6 of the present invention, a thin and continuous layer of an atmosphere adjusting agent can be formed to an even thickness on the hearth 2 by means of the raw material feed device 10 and, hence, homogenized granular iron of improved quality can be obtained in a higher yield with less cost. Further, such a thin and continuous layer of atmosphere adjusting agent formed to an even thickness on the hearth 1 enables a higher metallization rate to be reached while protecting the hearth 1. Further, since it is possible to supply the atmosphere adjusting agent in a minimum amount required, wasteful use of the carbonaceous material containing powder can be avoided, while at the same time reduced iron can be prevented from becoming heterogeneous due to differences on the hearth 1.

In the case where the moving hearth type furnace 11 is of the rotary type, there is a difference in moving speed between the inner circumference side and the outer circumference side of the hearth which may cause the atmospheric gas in the furnace to flow differently at different speeds. However, the process according to this example brings an excellent effect of avoiding variations in the reduced state of iron in the formed raw material due to such differences.

In Example 6, the atmosphere adjusting agent layer was formed on the hearth 1 by supplying the atmosphere adjusting agent thereto with use of the raw material feed device 10 according to embodiment 1 and then a layer of formed raw material was formed on the hearth 1 by supplying the formed raw material. The raw material feed device 10 may be replaced with a raw material feed device having a supply duct not partitioned with a partition panel or any one of the raw material feed devices according to any embodiments of the present invention.

Example 7

In the reduced iron production method according to this example, the feed device 10 shown in FIG. 9 was used. First, a carbonaceous material containing powder was spread over the hearth 1 of the moving hearth type furnace 11 to form a layer of the carbonaceous material containing powder on the hearth 1.

Subsequently, a formed raw material (pellet) prepared from a powdery raw material of reduced iron prepared by mixing at least a carbonaceous reductant and an iron oxide containing substance was supplied to form a layer thereof on the hearth 2 so as not to come into direct contact with the hearth 2. The formed raw material of reduced iron was then subjected to solid-state reduction at an elevated temperature, and metallic iron resulting from the solid-state reduction was melted by subsequent heating to cause separation of at least those slag components contained in the powdery raw material, followed by ejection of molten iron having separated from the slag components through a molten iron ejecting port.

The molten iron ejecting port provided on the hearth 1 of the moving hearth type furnace comprises, for example, a recess for collecting and storing molten iron, a molten iron ejecting hole located in a lower portion of the recess, and a slide valve located under the molten iron ejecting hole.

As can be clearly understood from the foregoing, Example 7 is similar to Example 6 except that Example 6 is directed to the production of granular iron whereas Example 7 is directed to the production of molten iron and, hence, Example 7 can provide advantages similar to those of Example 6. As in Example 6, the raw material feed device 10 may be replaced with a raw material feed device having a supply duct not partitioned with a partition panel or any one of the raw material feed devices according to the embodiments shown in FIGS. 10 to 12.

According to the present invention, blast furnace dust, electric furnace dust, mill scale, sludge, steel mill dust and the like can be used as carbonaceous reductant and iron oxide containing substance.

According to the present invention thus constituted, re-oxidation of reduced iron can be minimized thereby to increase the Fe purity of resulting metallic iron while byproduct slag can be substantially completely separated from the metallic iron by properly controlling the atmospheric gas particularly in the carburizing-melting-coalescence stage subsequent to the solid-state reduction stage. Further, the present invention makes it possible to minimize seeping of molten slag and erosion or wear of the hearth refractories due to molten FeO produced, thereby efficiently producing granular metallic iron having a higher purity of iron by way of a continuous production.

In practicing the present invention, if an appropriate amount of a CaO source is intentionally added to the formed raw material under preparation to raise the basicity of resulting slag, sulfur originating from the carbon material can be efficiently captured by slag, thereby lowering the sulfur content of resulting in metallic iron and mitigating the desulfurization duty to be imposed later. Further, the amount of sulfur exhausted from the furnace in the form of $SO_X$ can be reduced as much as possible and, hence, the desulfurization duty, which is imposed if such exhaust gas is desulfurized, can be lessened.

If an ironmaking-steelmaking total production system is constructed having a steelmaking furnace located adjacent the reduction melting equipment to use high-temperature metallic iron as it is or as molten by further heating as an iron source, such a production system can effectively utilize the heat retained by such metallic iron and hence is very suitable for practical production.

Further, according to the present invention, the slag components resulting from the formed raw material are allowed to deposit on the hearth refractories of a moving hearth type reduction melting furnace and then the resulting slag deposit layer is removed periodically or continuously during production, thereby preventing particulate metallic iron from adhering to or depositing on a slag deposit layer in a continuous production while constantly keeping the hearth surface smooth by virtue of the self-mending action of damaged surfaces of the deposit layer. Thus, a continuous production can be ensured without substantially damaging the initially-provided hearth refractories, while the hearth maintenance cycle can be largely prolonged thereby enhancing the continuous production efficiency remarkably. Since the mending of the hearth is achieved by the self-mending action that effectively utilizes slag produced during the production as it is, there is no need to supply any mending material from the outside except the material for forming the primary protective layer in the beginning of the production and, hence, this method is very cost-effective. If recycled slag is used as the material for forming the primary protective layer, the method becomes more cost-effective.

The feed device of the invention is capable of forming a continuous layer of auxiliary raw material having a substantially even thickness on the hearth to a desired thickness. Since the duct can be partitioned in the widthwise direction of the hearth, the amount of an auxiliary raw material to be supplied can be varied by controlling the opening of each division of the duct, thereby making it possible to form a thin and continuous layer of auxiliary raw material having a substantially even thickness in the widthwise direction of the hearth even if it is a rotary hearth. It is, therefore, no need to provide layer thickness adjusting means such as a leveler or a smoother in the furnace, resulting in a less costly production. Further, if the feed device of the present invention is used to supply an auxiliary raw material onto the hearth, such an auxiliary raw material is prevented from adhering to the inner wall surface of the duct thereby effectively avoiding such problems as clogging of the duct and fall of deposited auxiliary raw material in a lump.

While certain presently preferred embodiments of the present invention have been described in detail, as will be apparent for those skilled in the art, certain changes or modifications may be made in embodiment without departing from the spirit and scope of the present invention as defined by the following claims.

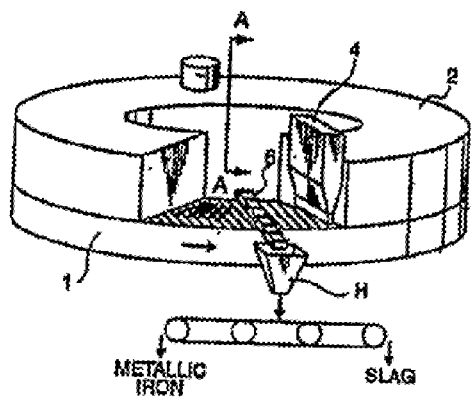

What is claimed is:

1. A method of producing granular metallic iron, the method comprising:
    heating a formed raw material including S and comprising a carbonaceous reductant and a substance containing iron oxide in a reduction melting furnace to subject the iron oxide contained in the formed raw material to solid-state reduction; and
    carburizing reduced iron resulting from the solid-state reduction with carbon contained in the carbonaceous reductant to cause the reduced iron to melt, while
    separating off gangue components contained in the formed raw material and
    causing resulting molten metallic iron to coalesce into the granular metallic iron,
    wherein
        an atmospheric gas present in proximity to the formed raw material in the carburizing and melting step has a reduction degree of not less than 0.5; and
        the formed raw material is blended with a calcium oxide source during preparation thereof to adjust a basicity (CaO/SiO$_2$) of a slag forming component contained in the formed raw material to a value within a range between 0.6 and 1.8.

2. The method according to claim 1, wherein an atmosphere adjusting agent of a carbonaceous material is charged onto a hearth of the reduction melting furnace at least before the formed raw material melts.

3. The method according to claim 2, wherein the atmosphere adjusting agent has a mean particle diameter of 3 mm or less and is charged onto the hearth to a thickness of 7 mm or less.

4. The method according to claim 1, wherein the granular metallic iron has content of 0.10 weight % or less.

5. The method according to claim 1, wherein:
 the reduction melting furnace is a moving hearth reduction melting furnace partitioned into at least two divisions in a moving direction of the hearth, one division on an upstream side in the moving direction being adapted for the solid-state reduction, another division on a downstream side in the moving direction being adapted for the carburizing and melting; and
 each of the divisions is controlled on a division basis so that a temperature and an atmospheric gas composition therein are adjusted.

6. The method according to claim 5, wherein the temperature of the carburizing and melting division is 50 to 200° C. higher than that of the solid-state reduction division.

7. The method according to claim 1, wherein the iron oxide in a last stage of the solid-state reduction has a reduction rate of not less than 80% and a residual carbon content of not less than 3.5%.

8. A method of producing a molten steel, comprising charging granular metallic iron produced by a method as recited in claim 1 into a steelmaking furnace.

9. The method according to claim 8, wherein the temperature of the metallic iron to be charged into the steelmaking furnace is maintained at 800° C. or higher.

10. The method according to claim 8, wherein the granular metallic iron is melted before the charging of the same into the steelmaking furnace.

* * * * *

UNITED STATES PATENT AND TRADEMARK OFFICE
CERTIFICATE OF CORRECTION

PATENT NO.       : 6,630,010 B2
APPLICATION NO.  : 09/818591
DATED            : October 7, 2003
INVENTOR(S)      : Shuzo Ito et al.

It is certified that error appears in the above-identified patent and that said Letters Patent is hereby corrected as shown below:

The title page showing the illustrative figure should be deleted to be replaced with the attached title page.

Delete Figure 1 in its entirety and insert the following Figure 1
--

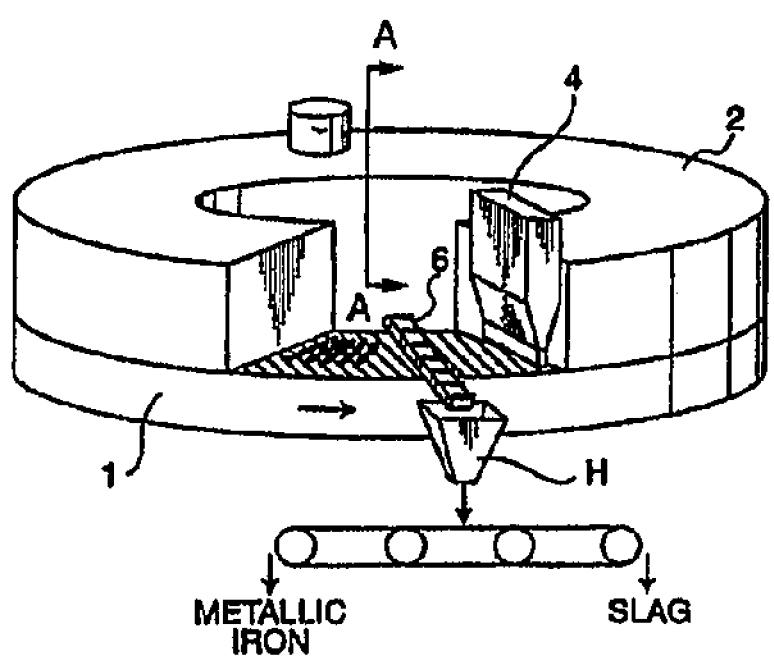

UNITED STATES PATENT AND TRADEMARK OFFICE
CERTIFICATE OF CORRECTION

PATENT NO. : 6,630,010 B2
APPLICATION NO. : 09/818591
DATED : October 7, 2003
INVENTOR(S) : Shuzo Ito et al.

It is certified that error appears in the above-identified patent and that said Letters Patent is hereby corrected as shown below:

Delete Figure 9 in its entirety and insert the following Figure 9
--

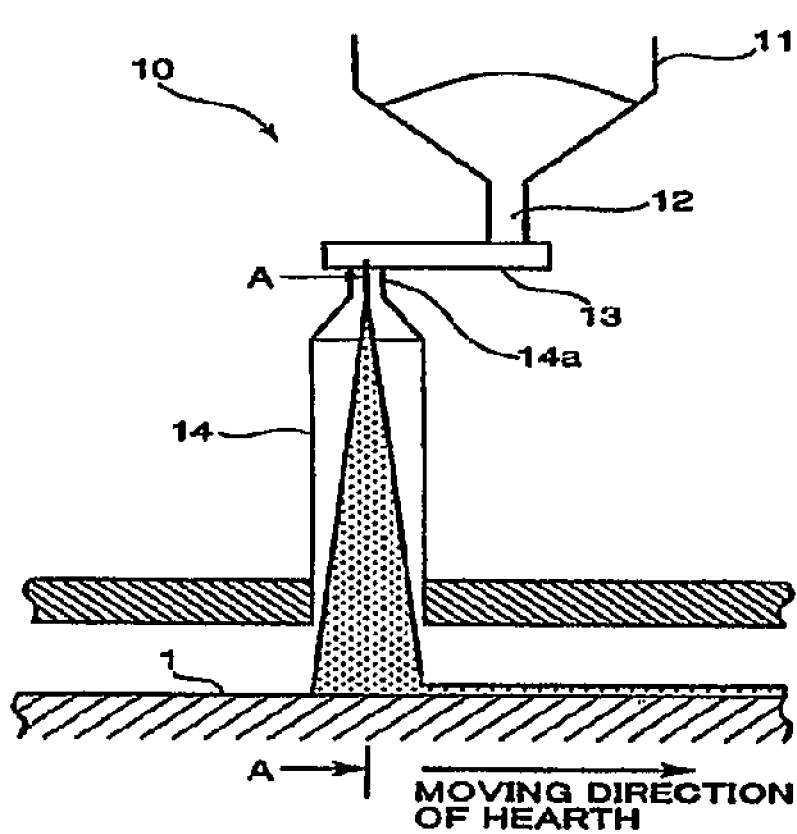

--

UNITED STATES PATENT AND TRADEMARK OFFICE
CERTIFICATE OF CORRECTION

| | |
|---|---|
| PATENT NO. | : 6,630,010 B2 |
| APPLICATION NO. | : 09/818591 |
| DATED | : October 7, 2003 |
| INVENTOR(S) | : Shuzo Ito et al. |

Figure 10:
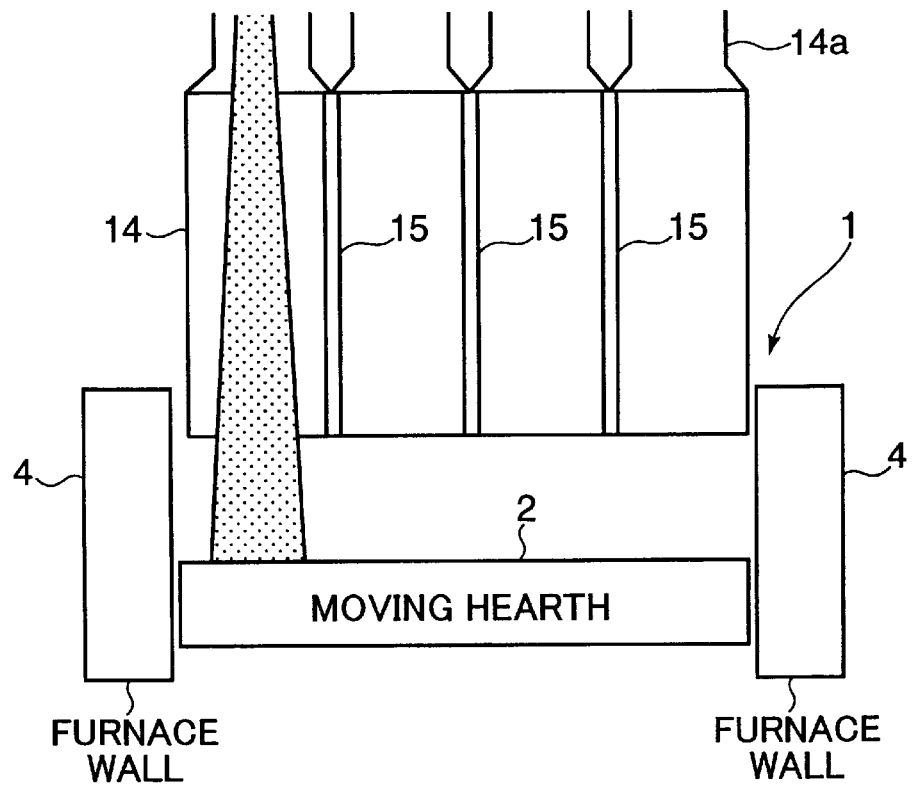
FIG. 10 is a sectional view taken on line A—A in FIG. 9.

It is certified that error appears in the above-identified patent and that said Letters Patent is hereby corrected as shown below:

Delete Figures 10 & 11 in their entirety and insert the following figures 10 & 11

--

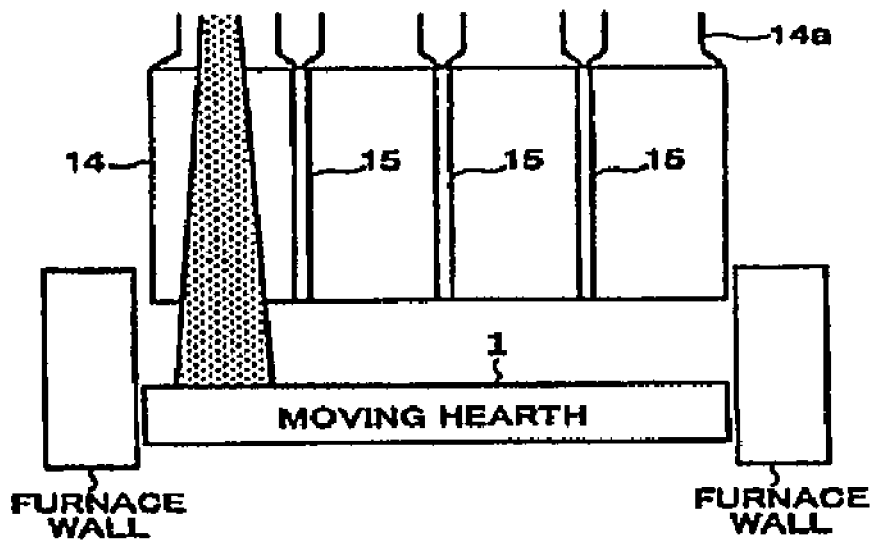

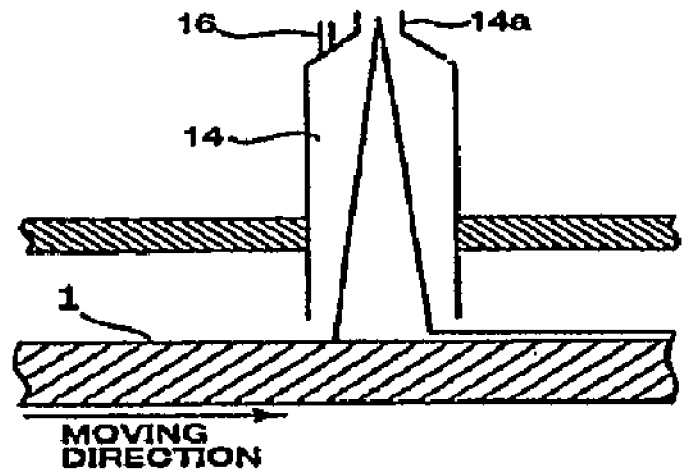

--

UNITED STATES PATENT AND TRADEMARK OFFICE
CERTIFICATE OF CORRECTION

PATENT NO.        : 6,630,010 B2                                      Page 4 of 6
APPLICATION NO.   : 09/818591
DATED             : October 7, 2003
INVENTOR(S)       : Shuzo Ito et al.

It is certified that error appears in the above-identified patent and that said Letters Patent is hereby corrected as shown below:

Delete Figures 12 & 13 in their entirety and insert the following Figures 12 & 13

--

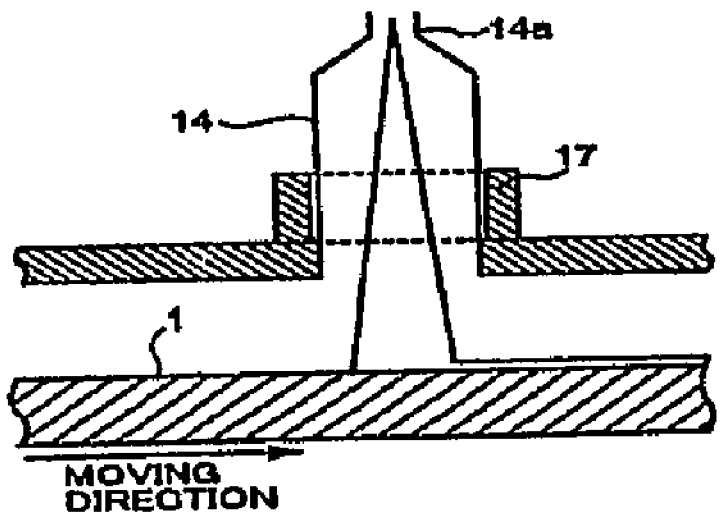

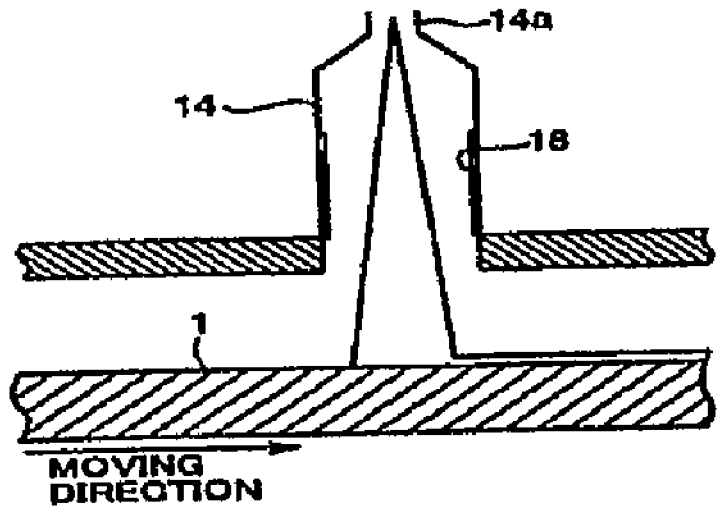

--

UNITED STATES PATENT AND TRADEMARK OFFICE
CERTIFICATE OF CORRECTION

PATENT NO. : 6,630,010 B2
APPLICATION NO. : 09/818591
DATED : October 7, 2003
INVENTOR(S) : Shuzo Ito et al.

It is certified that error appears in the above-identified patent and that said Letters Patent is hereby corrected as shown below:

Column 7, line 9, "FeG" should read --FeO--
Column 7, line 47, "monoixide" should read --monoxide--
Column 8, line 49, "1400°0C" should read --1400°C--
Column 12, line 18, "Fe" should read --FeO--
Column 13, line 44, "cork" should read --coke--
Column 14, line 42, "14" should read --13--
Column 27, line 29, delete "9"
Column 30, line 64, delete "11"
Column 31, line 28, delete "11"
Column 31, line 53, "2" should read --1--
Column 32, line 34, "2" should read --1--
Column 32, line 46, delete "11"
Column 33, line 2, delete "11"
Column 33, line 9, "2" should read --1--
Column 33, line 10, "2" should read --1--
Column 35, line 13, "has content" should read --has a S content--

Signed and Sealed this

Twentieth Day of November, 2007

JON W. DUDAS
*Director of the United States Patent and Trademark Office*

(12) United States Patent
Ito et al.

(10) Patent No.: US 6,630,010 B2
(45) Date of Patent: Oct. 7, 2003

(54) METHOD OF PRODUCING METALLIC IRON

(75) Inventors: Shuzo Ito, Osaka (JP); Yasuhiro Tanigaki, Osaka (JP); Shoichi Kikuchi, Osaka (JP); Osamu Tsuge, Osaka (JP); Isao Kobayashi, Osaka (JP); Keisuke Honda, Osaka (JP); Koji Tokuda, Osaka (JP); Hidekazu Okamoto, Osaka (JP)

(73) Assignee: Midrex International B.V. Zurich Branch, Zurich (SE)

(*) Notice: Subject to any disclaimer, the term of this patent is extended or adjusted under 35 U.S.C. 154(b) by 0 days.

(21) Appl. No.: 09/818,591

(22) Filed: Mar. 28, 2001

(65) Prior Publication Data
US 2001/0027701 A1 Oct. 11, 2001

(30) Foreign Application Priority Data

| Mar. 30, 2000 | (JP) | 2000-094764 |
| Mar. 31, 2000 | (JP) | 2000-098825 |
| Apr. 18, 2000 | (JP) | 2000-116383 |

(51) Int. Cl.$^7$ .................... C21B 11/00
(52) U.S. Cl. .................... 75/484; 75/500; 75/503; 75/504
(58) Field of Search .................... 75/484, 500, 503, 75/504

(56) References Cited

U.S. PATENT DOCUMENTS

| 1,885,381 A | 11/1932 | Simpson |
| 3,197,303 A | 7/1965 | Collin |
| 3,443,931 A | 5/1969 | Beggs et al. |
| 3,452,972 A | 7/1969 | Beggs |
| 3,947,621 A | 3/1976 | Collin et al. |
| 5,637,133 A | 6/1997 | Munnix et al. |
| 5,885,321 A | 3/1999 | Meissner et al. |

(List continued on next page.)

FOREIGN PATENT DOCUMENTS

| DE | 195 43 074 | 5/1997 |
| EP | 0 947 586 | 10/1999 |
| EP | 0 969 105 | 1/2000 |
| EP | 1 026 265 | 8/2000 |
| JP | 11-106812 | 4/1999 |
| JP | 11-335712 | 12/1999 |
| JP | 2000-45008 | 2/2000 |
| WO | WO 98/46953 | 10/1998 |
| WO | WO 98/59079 | * 12/1998 |
| WO | WO 99/16913 | 4/1999 |
| WO | WO 00/29628 | 5/2000 |

*Primary Examiner*—Melvyn Andrews
(74) *Attorney, Agent, or Firm*—Oblon, Spivak, McClelland, Maier & Neustadt, P.C.

(57) ABSTRACT

The present invention is directed to a method of producing granular metallic iron, including: heating a formed raw material comprising a carbonaceous reductant and a substance containing iron oxide in a reduction melting furnace to subject the iron oxide contained in the formed raw material to solid-state reduction; and carburizing reduced iron resulting from the solid-state reduction with carbon contained in the carbonaceous in the formed raw material and causing resulting molten metallic iron to coalesce into the granular metallic iron, wherein an atmospheric gas present in proximity to the formed raw material in the carburizing and melting step has a reduction degree of not less than 0.5. The present invention is also directed to a method of producing metallic iron, including forming a deposit layer containing slag produced in the reduction melting process on hearth refractories, thereby protecting the hearth refractories while producing the metallic iron. The present invention is further directed to a device for supplying an auxiliary raw material to a hearth of a moving hearth type reduction melting furnace adapted to produce metallic iron, the device including a supply duct vertically connecting with a ceiling portion of the furnace.

10 Claims, 24 Drawing Sheets